(12) United States Patent
Onuki

(10) Patent No.: US 12,348,040 B2
(45) Date of Patent: Jul. 1, 2025

(54) POWER STORAGE SYSTEM

(71) Applicant: Honda Motor Co., Ltd., Tokyo (JP)

(72) Inventor: Yasumichi Onuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 863 days.

(21) Appl. No.: 17/409,772

(22) Filed: Aug. 23, 2021

(65) Prior Publication Data

US 2022/0077684 A1     Mar. 10, 2022

(30) Foreign Application Priority Data

Sep. 9, 2020 (JP) .................................. 2020-151145

(51) Int. Cl.
| | | |
|---|---|---|
| *H02J 3/32* | (2006.01) | |
| *H01M 10/42* | (2006.01) | |
| *H01M 10/657* | (2014.01) | |
| *H02J 7/00* | (2006.01) | |
| *H02M 3/158* | (2006.01) | |
| *H02M 7/5387* | (2007.01) | |
| *H02P 27/06* | (2006.01) | |

(52) U.S. Cl.
CPC .............. *H02J 3/32* (2013.01); *H01M 10/425* (2013.01); *H02J 7/0013* (2013.01); *H01M 2010/4271* (2013.01); *H01M 10/657* (2015.04); *H02M 3/158* (2013.01); *H02M 7/5387* (2013.01); *H02P 27/06* (2013.01)

(58) Field of Classification Search
None
See application file for complete search history.

(56) References Cited

U.S. PATENT DOCUMENTS

2018/0278168 A1 *   9/2018   Brown .................... H02P 27/06

FOREIGN PATENT DOCUMENTS

| CN | 108377668 | 8/2018 | |
|---|---|---|---|
| CN | 207910510 | 9/2018 | |
| EP | 2615466 | 7/2013 | |
| JP | H11329516 | 11/1999 | |
| JP | 2003121513 | 4/2003 | |
| JP | 2003121513 A * | 4/2003 | ......... G01R 31/3658 |
| JP | 2009296847 | 12/2009 | |
| JP | 2013077452 X | 4/2013 | |

(Continued)

OTHER PUBLICATIONS

JP-2003121513-A English machine translation (Year: 2003).*

(Continued)

*Primary Examiner* — Scott J. Chmielecki
(74) *Attorney, Agent, or Firm* — JCIPRNET

(57) ABSTRACT

A power storage system capable of appropriately increasing a temperature of a power storage device is provided. A power storage system (10) includes a battery (31) and a plurality of AC application units (33). The battery (31) includes a string (31*b*) which is formed by a plurality of cells (31*a*) connected in series to each other. The battery (31) includes a plurality of modules (35) which are formed by dividing the string (31*b*) into a plurality of substrings in series. The plurality of AC application units (33) respectively apply alternating currents I having phases set to attenuate a voltage fluctuation at both ends (the positive electrode terminal (BP) and the negative electrode terminal (BN)) of the battery (31) to each of the plurality of modules (35).

3 Claims, 19 Drawing Sheets

(56) References Cited

FOREIGN PATENT DOCUMENTS

| | | |
|---|---|---|
| JP | 2020022312 | 2/2020 |
| WO | 2011105083 | 9/2011 |
| WO | 2014046028 | 3/2014 |
| WO | WO-2020243655 A1 * 12/2020 | ............ B60L 3/0046 |

OTHER PUBLICATIONS

"Office Action of China Counterpart Application", issued on Dec. 16, 2023, with English translation thereof, p. 1-p. 13.
"Office Action of Japan Counterpart Application", issued on Nov. 28, 2023, with English translation thereof, p. 1-p. 6.

* cited by examiner

POWER STORAGE SYSTEM

CROSS-REFERENCE TO RELATED APPLICATION

This application claims the priority benefit of Japan Application No. 2020-151145, filed on Sep. 9, 2020. The entirety of the above-mentioned patent application is hereby incorporated by reference herein and made a part of this specification.

BACKGROUND

Technical Field

The disclosure relates to a power storage system.

Description of Related Art

Conventionally, for example, a vehicle equipped with a power storage device including a plurality of battery cells connected in series as a power source is known (for example, see Japanese Laid-Open No. 2009-296847 (Patent Document 1)).

Further, conventionally, for example, in order to secure a desired output of a power storage device, there is known a device applying an AC voltage to both ends of a power storage device and increasing a temperature of the power storage device by heat generation at an internal resistance through which an alternating current flows (for example, see Japanese Laid-Open No. H11-329516 (Patent Document 2)).

Incidentally, when a capacitor connected in parallel to the power storage device is provided in a device that applies an alternating current to both ends of the power storage device to increase the temperature as in the above-described conventional device, there is concern that the amount of the current flowing through the capacitor having a relatively smaller impedance than the power storage device may increase and an increase in the amount of the current flowing through the power storage device may be suppressed. For example, when the power storage device is connected to a power conversion device including an inverter or the like, a capacitor provided in the power conversion device is connected in parallel to the power storage device so that a desired current flowing through the power storage device is suppressed.

SUMMARY (1) According to an embodiment of the disclosure, there is provided a power storage system (for example, a power storage system 10 of the embodiment) including: a power storage device (for example, a battery 31 of the embodiment) which is formed by connecting a plurality of power storage elements (for example, cells 31a of the embodiment); a plurality of modules (for example, modules 35 of the embodiment) which are formed by dividing the power storage device into a plurality of parts; and a plurality of AC application units (for example, AC application units 33 of the embodiment) which apply alternating currents (for example, alternating currents I (Bt1) to I (Bt29) of the embodiment) having phases set to attenuate a voltage fluctuation at both ends (for example, a positive electrode terminal BP and a negative electrode terminal BN of the embodiment) of the power storage device to the plurality of modules.

DESCRIPTION OF THE EMBODIMENTS

Figure 1:
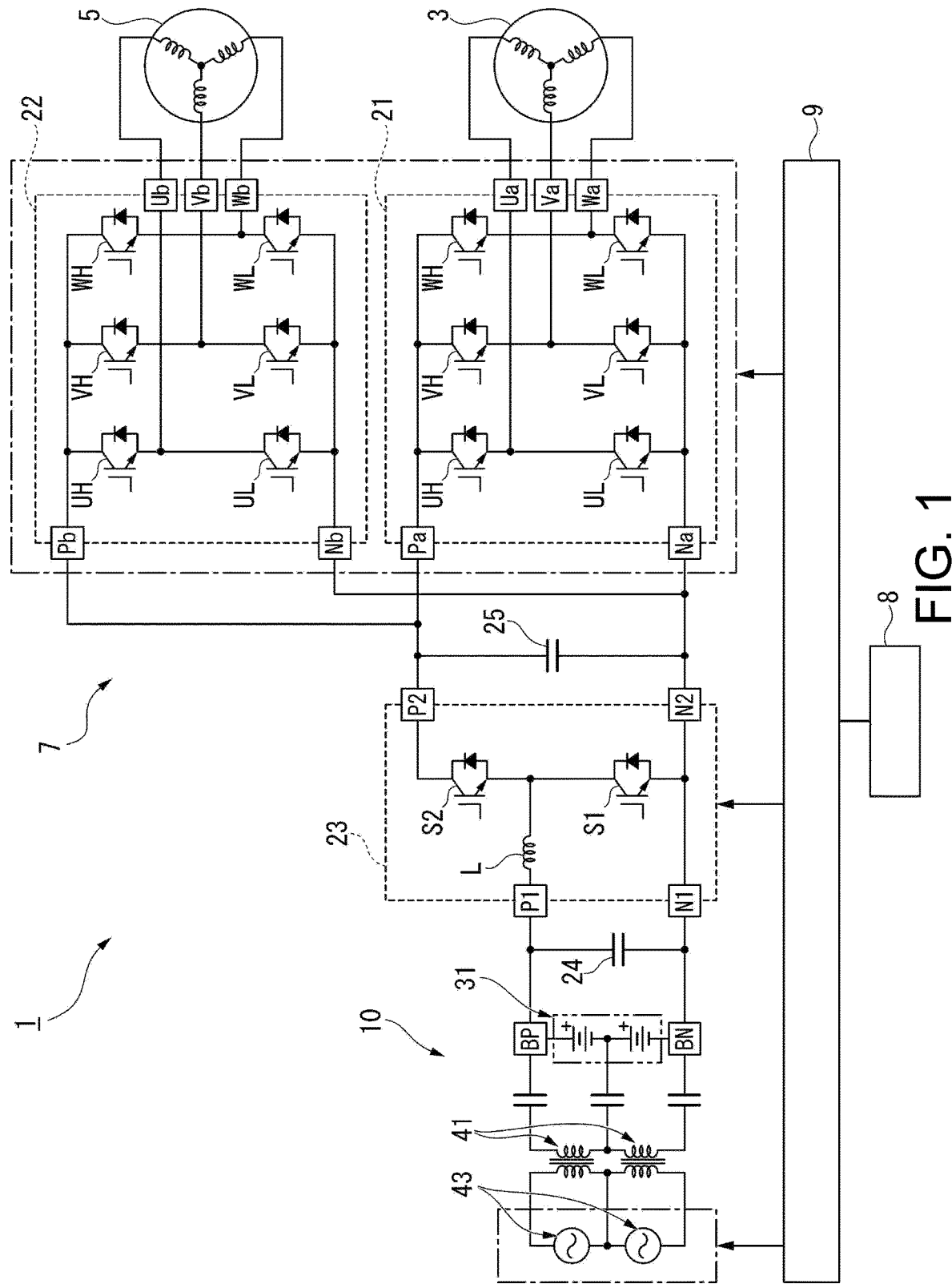
FIG. 1 is a diagram showing a configuration of a vehicle equipped with a power storage system of an embodiment of the disclosure.

The disclosure provides a power storage system capable of appropriately increasing a temperature of a power storage device.

(2) In the power storage system of the above (1), the plurality of modules may be n modules by any natural number n of 2 or more and the plurality of AC application units may apply the alternating currents (for example, alternating currents I (Bt1) to I (Bt14) of the embodiment) having the phases sequentially offset from each other by (360°/n) to the n modules.

(3) In the power storage system of the above (1), the plurality of modules may be (m×k) modules by any natural number m of 2 or more and any natural number k, k module sets (for example, a module pair 61 and a module set 81 of the embodiment) may be formed by m modules sequentially adjacent to each other, and the plurality of AC application units may apply the alternating currents (for example, alternating currents I (Bt15) to I (Bt29) of the embodiment) having the phases sequentially offset from each other by (360°/m) to the m modules in each of the k module sets.

(4) In the power storage system of the above (3), the plurality of AC application units may apply the alternating currents having the phases of the same combination between the k module sets to the m modules of the k module sets of each other.

(5) In the power storage system of the above (3), the plurality of AC application units may apply the alternating currents having the phases sequentially offset from each other by (360°/(m×k)) in the k module sets to the m modules of the k module sets of each other.

According to the above (1), since the power storage system includes the plurality of AC application units which apply predetermined alternating currents to the plurality of modules formed by dividing the power storage device, it is possible to attenuate the voltage fluctuation at both ends of the power storage device. Since the voltage fluctuation at both ends of the power storage device is attenuated, it is possible to suppress an alternating current from flowing through a capacitor even when the capacitor is connected in parallel to the power storage device. Since a decrease in the alternating current flowing through the power storage device is suppressed, it is possible to appropriately promote an increase in temperature of the power storage device by heat generation at the internal resistance of the power storage device.

It is possible to suppress an increase in the withstand voltage and cost of the AC application unit by increasing the number of divisions of the power storage device, that is, the number of the plurality of AC application units respectively applying the alternating currents to the plurality of modules.

In the case of the above (2), it is possible to cancel the voltage fluctuation generated at both ends of each module and to attenuate the voltage fluctuation at both ends of the power storage device by applying the alternating currents having the phases sequentially offset from each other by (360°/n) to n modules.

In the case of the above (3), since the alternating currents having phases offset from each other by (360°/m) are sequentially applied to m modules in each of k module sets, the voltage fluctuation generated at both ends of m continuously adjacent modules is canceled and the voltage fluctuation at both ends of the power storage device can be canceled.

In the case of the above (4), since the alternating currents having the phases of the same combination between k module sets are applied to m modules of k module sets of each other, it is possible to further promote the attenuation of the voltage fluctuation at both ends of the power storage device when the positive and the negative of the alternating current are symmetrical.

In the case of the above (5), since the alternating currents having the phases sequentially offset from each other by (360°/(m×k)) in k module sets are applied to m modules of k module sets of each other, it is possible to further promote the attenuation of the voltage fluctuation at both ends of the power storage device when the positive and the negative of the alternating current are asymmetrical.

Hereinafter, a power storage system 10 according to an embodiment of the disclosure will be described with reference to the accompanying drawings.

FIG. 1 is a diagram showing a configuration of a vehicle 1 equipped with a power storage system 10 of the embodiment.

The power storage system 10 according to the embodiment is mounted in, for example, the vehicle 1 such as an electric vehicle. The electric vehicle is an electric automobile, a hybrid vehicle, or a fuel cell vehicle. The electric automobile is driven by using a battery as a power source. The hybrid vehicle is driven by using a battery and an internal combustion engine as a power source. The fuel cell vehicle is driven by using a fuel cell as a power source.

The vehicle 1 includes, for example, a first rotary electric machine 3, a second rotary electric machine 5, a power control unit 7, an electronic control unit 8, a gate drive unit 9, and a power storage system 10.

For example, the first rotary electric machine 3 is for driving the vehicle 1 to run and generates a rotational drive force by performing a power running operation using the electric power supplied from the power storage system 10 via the power control unit 7. Additionally, the first rotary electric machine 3 may generate generated electric power by performing a regenerative operation using the rotational power input from the vehicle wheel to the rotary shaft.

For example, the second rotary electric machine 5 is for generating electric power of the vehicle 1 and generates generated electric power by the rotational power input to the rotary shaft. For example, when the second rotary electric machine 5 is connectable to the internal combustion engine, electric power is generated by the power of the internal combustion engine. For example, when the second rotary electric machine 5 is connectable to the vehicle wheel, the generated electric power is generated by the regenerative operation using the rotational power input from the vehicle wheel to the rotary shaft. Additionally, when the second rotary electric machine 5 is connectable to the vehicle wheel, the rotational drive force may be generated by the power running operation using the electric power supplied from the power storage system 10 via the power control unit 7.

For example, each of the first rotary electric machine 3 and the second rotary electric machine 5 is a three-phase AC brushless DC motor. The three phases are U phase, V phase, and W phase. Each of the rotary electric machines 3 and 5 includes a rotor having a permanent magnet for a field magnet and a stator having a three-phase stator coil for generating a rotating magnetic field for rotating the rotor. The three-phase stator coil is connected to the power control unit 7.

The power control unit 7 includes a first power conversion unit 21, a second power conversion unit 22, a third power conversion unit 23, a first smoothing capacitor 24, and a second smoothing capacitor 25.

The first power conversion unit 21 and the second power conversion unit 22 include, for example, the same circuit such as an inverter that performs power conversion between direct current and alternating current. Each of the first power conversion unit 21 and the second power conversion unit 22 includes a positive electrode terminal, a negative electrode terminal, and three-phase terminals which are a U-phase terminal, a V-phase terminal, and a W-phase terminal.

A positive electrode terminal Pa of the first power conversion unit 21 and a positive electrode terminal Pb of the second power conversion unit 22 are connected to a second positive electrode terminal P2 of the third power conversion unit 23. A negative electrode terminal Na of the first power conversion unit 21 and a negative electrode terminal Nb of the second power conversion unit 22 are connected to a second negative electrode terminal N2 of the third power conversion unit 23.

Three-phase terminals Ua, Va, and Wa of the first power conversion unit 21 are connected to three-phase stator coils of the first rotary electric machine 3. Three-phase terminals Ub, Vb, and Wb of the second power conversion unit 22 are connected to three-phase stator coils of the second rotary electric machine 5.

Each of the first power conversion unit 21 and the second power conversion unit 22 includes, for example, a bridge circuit formed by a plurality of switching elements and rectifying elements bridge-connected in three phases. The switching element is a transistor such as an insulated gate bipolar transistor (IGBT) or a metal oxide semi-conductor field effect transistor (MOSFET). The rectifying element is a diode connected in parallel to each transistor.

The bridge circuit includes a pair of high-side arm and low-side arm U-phase transistors UH and UL, a pair of high-side arm and low-side arm V-phase transistors VH and VL, and a pair of high-side arm and low-side arm W-phase transistors WH and WL. The bridge circuit includes a free wheeling diode connected in the forward direction from the emitter toward the collector between the collector and the emitter of each of the transistors UH, UL, VH, VL, WH, and WL.

The collectors of the high-side arm transistors UH, VH, and WH are connected to the positive electrode terminal (the positive electrode terminal Pa or the positive electrode terminal Pb). The emitters of the low-side arm transistors UL, VL, and WL are connected to the negative electrode terminal (the negative electrode terminal Na or the negative electrode terminal Nb). In three phases, the emitters of the high-side arm transistors UH, VH, and WH and the collectors of the low-side arm transistors UL, VL, and WL are connected to respective phase terminals of the three phases (the respective phase terminals Ua, Va, and Wa or the respective phase terminals Ub, Vb, and Wb).

The first power conversion unit 21 and the second power conversion unit 22 respectively control the operations of the first rotary electric machine 3 and the second rotary electric machine 5. Each of the power conversion units 21 and 22 switches the on (conduction)/off (interruption) state of a pair of transistors of each phase based on a gate signal which is a switching command input to the gate of each of the transistors UH, VH, WH, UL, VL, and WL.

For example, when the respective rotary electric machines 3 and 5 perform a power running operation, the respective power conversion units 21 and 22 convert the DC power input from each of the positive electrode terminals Pa and Pb and each of the negative electrode terminals Na and Nb into the three-phase AC power and supply the AC power to the respective rotary electric machines 3 and 5. The respective power conversion units 21 and 22 generate the rotational drive force by sequentially commutating the energization of the three-phase stator coils of the respective rotary electric machines 3 and 5.

For example, when the respective rotary electric machines 3 and 5 perform a regenerative operation, the respective power conversion units 21 and 22 convert the three-phase AC power input from the three-phase terminals Ua, Va, Wa, Ub, Vb, and Wb into the DC power, for example, by the on (conduction)/off (interruption) drive of a pair of transistors of each phase synchronized with the rotation of each of the rotary electric machines 3 and 5. Each of the power conversion units 21 and 23 can supply the DC power converted from the three-phase AC power to the power storage system 10 via the third power conversion unit 23.

The third power conversion unit 23 includes, for example, a DC-DC converter that performs bidirectional power conversion between step-up and step-down. The third power conversion unit 23 includes a first positive electrode terminal P1, a first negative electrode terminal N1, a second positive electrode terminal P2, and a second negative electrode terminal N2.

The first positive electrode terminal P1 and the first negative electrode terminal N1 of the third power conversion unit 23 are connected to a positive electrode terminal BP and a negative electrode terminal BN of the power storage system 10. The second positive electrode terminal P2 and the second negative electrode terminal N2 of the third power conversion unit 23 are connected to the positive electrode terminals Pa and Pb and the negative electrode terminals Na and Nb of the respective power conversion units 21 and 22.

The third power conversion unit 23 includes, for example, a pair of low-side arm and high-side arm switching elements and rectifying elements, and a reactor. The switching element is a transistor such as IGBT or MOSFET. The pair of low-side arm and high-side arm switching elements are a first transistor S1 of a low side arm and a second transistor S2 of a high side arm. The rectifying elements are free wheeling diodes which are connected in parallel in the forward direction from the emitter toward the collector between the collector and the emitter of each of the first transistor S1 and the second transistor S2. The reactor is a choke coil L.

The emitter of the first transistor S1 of the low side arm is connected to the first negative electrode terminal N1 and the second negative electrode terminal N2. The collector of the second transistor S2 of the high side arm is connected to the second positive electrode terminal P2. The collector of the first transistor S1 and the emitter of the second transistor S2 are connected to a first end of both ends of the choke coil L. A second end of both ends of the choke coil L is connected to the first positive electrode terminal P1.

The third power conversion unit 23 switches the on (conduction)/off (interruption) state of each of the transistors S1 and S2 based on a gate signal which is a switching command input to the gate of each of the transistors S1 and S2.

At the time of step-up, the third power conversion unit 23 raises the electric power input from the power storage system 10 to the first positive electrode terminal P1 and the first negative electrode terminal N1 and outputs the raised electric power from the second positive electrode terminal P2 and the second negative electrode terminal N2. The third power conversion unit 23 stores magnetic energy by direct current excitation of the reactor (choke coil L) when the second transistor S2 of the high side arm is turned off (interrupted) and the first transistor S1 of the low side arm is turned on (conducted). The third power conversion unit 23 generates a voltage higher than those of the first positive electrode terminal P1 and the first negative electrode terminal N1 in the second positive electrode terminal P2 and the second negative electrode terminal N2 by superimposing the induced voltage generated by the magnetic energy of the reactor (choke coil L) and the voltage applied to the first positive electrode terminal P1 and the first negative electrode terminal N1 when the second transistor S2 of the high side arm is turned on (conducted) and the first transistor S1 of the low side arm is turned off (interrupted).

At the time of step-down, the third power conversion unit 23 drops the electric power input from the second positive electrode terminal P2 and the second negative electrode terminal N2 and outputs the dropped electric power from the first positive electrode terminal P1 and the first negative electrode terminal N1 to the power storage system 10. The third power conversion unit 23 stores the magnetic energy by direct current excitation of the reactor (choke coil L) when the second transistor S2 of the high side arm is turned on (conducted) and the first transistor S1 of the low side arm is turned off (interrupted). The third power conversion unit 23 generates a voltage lower than those of the second positive electrode terminal P2 and the second negative electrode terminal N2 in the first positive electrode terminal P1 and the first negative electrode terminal N1 by dropping the induced voltage generated by the magnetic energy of the reactor (choke coil L) when the second transistor S2 of the high side arm is turned off (interrupted) and the first transistor S1 of the low side arm is turned on (conducted).

The first smoothing capacitor 24 is connected between the first positive electrode terminal P1 and the first negative electrode terminal N1 of the third power conversion unit 23. The first smoothing capacitor 24 is connected in parallel to the power storage system 10. The first smoothing capacitor 24 smoothes the voltage fluctuation generated by the on/off switching operation of the first transistor S1 and the second transistor S2 at the time of step-down of the third power conversion unit 23.

The second smoothing capacitor 25 is connected between the second positive electrode terminal P2 and the second negative electrode terminal N2 of the third power conversion unit 23. The second smoothing capacitor 25 smoothes the voltage fluctuation generated by the on/off switching operation of each of the transistors UH, UL, VH, VL, WH, and WL of each of the first power conversion unit 21 and the second power conversion unit 22. The second smoothing capacitor 25 smoothes the voltage fluctuation generated by the on/off switching operation of the first transistor S1 and the second transistor S2 at the time of step-up of the third power conversion unit 23.

The electronic control unit 8 controls each of the operations of the first rotary electric machine 3 and the second rotary electric machine 5. For example, the electronic control unit 8 is a software function unit that functions by executing a predetermined program using a processor such as a central processing unit (CPU). The software function unit is an electronic control unit (ECU) including a processor such as a CPU, a read only memory (ROM) for storing a program, a random access memory (RAM) for temporarily storing data, and an electronic circuit such as a timer. Additionally, at least a part of the electronic control unit 8 may be an integrated circuit such as large scale integration (LSI).

For example, the electronic control unit 8 executes current feedback control or the like using a current target value in accordance with a current detection value of the first rotary electric machine 3 and a torque command value of the first rotary electric machine 3 and generates a control signal input to the gate drive unit 9.

For example, the electronic control unit 8 executes current feedback control or the like using a current target value in accordance with a current detection value of the second rotary electric machine 5 and a regeneration command value of the second rotary electric machine 5 and generates a control signal input to the gate drive unit 9.

The control signal is a signal indicating a timing of turning on (conducting)/turning off (interrupting) each of the transistors UH, VH, WH, UL, VL, and WL of each of the first power conversion unit 21 and the second power conversion unit 22. For example, the control signal is a pulse width modulated signal or the like.

The electronic control unit 8 controls bidirectional power conversion between step-up and step-down of the third power conversion unit 23. For example, the electronic control unit 8 generates a control signal input to the gate drive unit 9 by using a current target value in accordance with a step-up voltage command for the step-up operation of the third power conversion unit 23 or a step-down voltage command for the step-down operation of the third power conversion unit 23. The control signal is a signal indicating a timing of turning on (conducting)/turning off (interrupting) each of the transistors S1 and S2 of the third power conversion unit 23.

The electronic control unit 8 controls the operations of a plurality of AC power supplies 43 of the power storage system 10 to be described later. For example, the electronic control unit 8 generates a control signal input to the gate drive unit 9 in accordance with a temperature detection value or a temperature estimation value of a battery 31 of the power storage system 10 to be described later. The control signal is a signal indicting a timing of turning on (conducting)/turning off (interrupting) each of transistors 52*a* and 52*b* of the plurality of AC power supplies 43. For example, the control signal is a pulse width modulated signal or the like.

The gate drive unit 9 generates a gate signal for actually turning on (conducting)/turning off (interrupting) each of the transistors UH, VH, WH, UL, VL, and WL of each of the first power conversion unit 21 and the second power conversion unit 22 based on the control signal transmitted from the electronic control unit 8. For example, the gate signal is generated by amplification and level shift of the control signal.

The gate drive unit 9 generates a gate signal for turning on (conducting)/turning off (interrupting) each of the first transistor S1 and the second transistor S2 of the third power conversion unit 23. For example, the gate drive unit 9 generates a gate signal of a duty ratio in accordance with a step-up voltage command for the step-up operation of the third power conversion unit 23 or a step-down voltage command for the regenerative operation of the third power conversion unit 23. The duty ratio is a ratio of the first transistor S1 and the second transistor S2.

The gate drive unit 9 generates a gate signal for turning on (conducting)/turning off (interrupting) each of the transistors 52*a* and 52*b* of the plurality of AC power supplies 43 of the power storage system 10 to be described later based on the control signal transmitted from the electronic control unit 8. For example, the gate signal is generated by amplification and level shift of the control signal.

Figure 2:
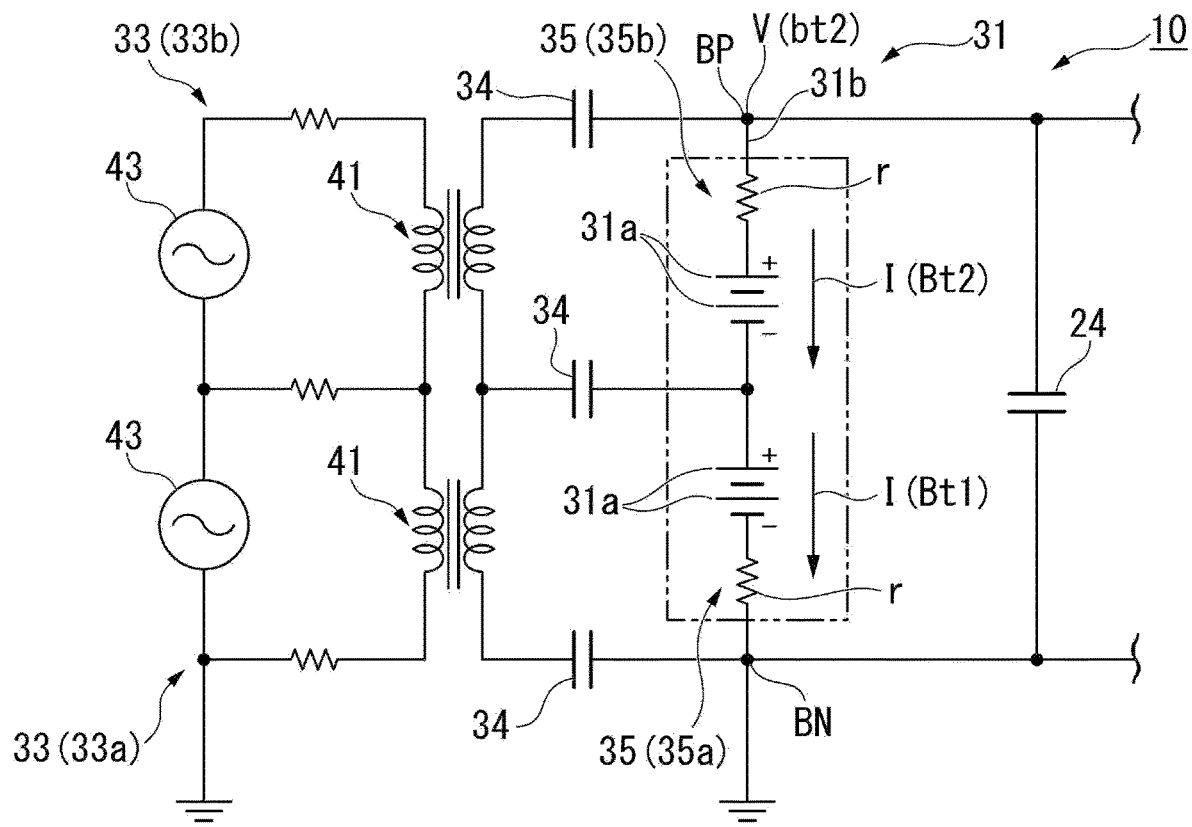
FIG. 2 is a diagram showing an alternating current applied to each module of a battery and a voltage applied to a positive electrode terminal of the battery of the power storage system of the embodiment of the disclosure.
Figure 3:
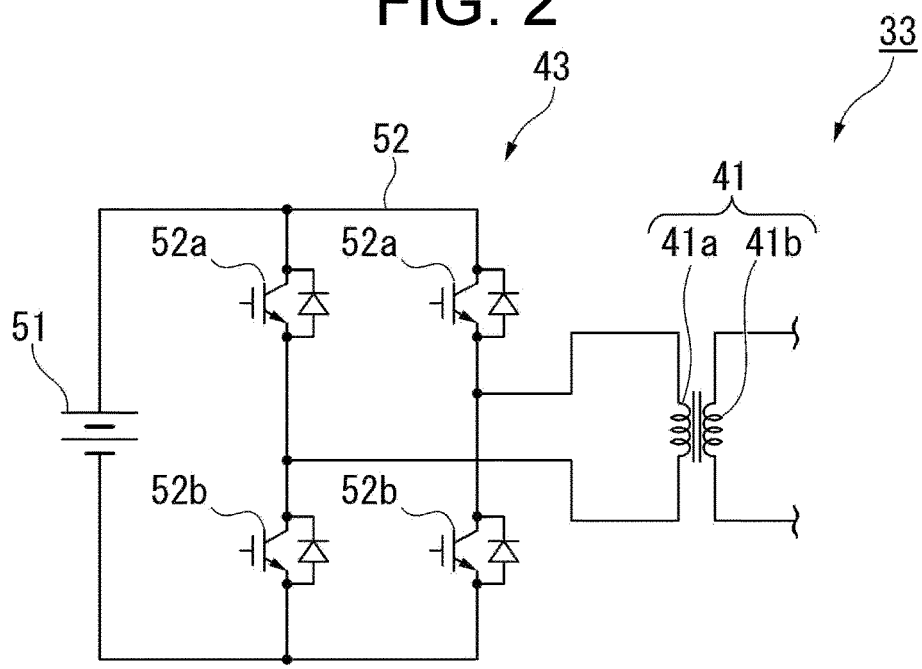
FIG. 3 is a diagram showing a configuration of an AC power supply of the power storage system of the embodiment of the disclosure.

FIG. 2 is a diagram showing an alternating current applied to each module 35 of the battery 31 and a voltage applied to the positive electrode terminal BP of the battery 31 of the power storage system 10 of the embodiment. FIG. 3 is a diagram showing a configuration of the AC power supply 43 of the power storage system 10 of the embodiment.

The power storage system 10 includes the battery 31, a plurality of AC application units 33, and a plurality of capacitors 34.

The battery 31 is, for example, a high-voltage battery that is a power source for the vehicle 1. The battery 31 includes a string 31*b* which is formed by a plurality of cells 31*a* connected in series to each other and a positive electrode terminal and a negative electrode terminal at both ends of the string 31*b*. The positive electrode terminal and the negative electrode terminal of the battery 31 are the positive electrode terminal BP and the negative electrode terminal BN of the above-described power storage system 10. The battery 31 includes the plurality of modules 35 formed by dividing the string 31*b* into a plurality of substrings in series. The plurality of modules 35 are, for example, a first module 35*a* and a second module 35*b* formed by dividing the string 31*b* into two parts.

The plurality of AC application units 33 are the AC application units 33 which are provided as many as the plurality of modules 35 of the battery 31. Each of the plurality of AC application units 33 is connected in parallel to different modules 35 of the plurality of modules 35 of the battery 31. The plurality of AC application units 33 are, for example, a first AC application unit 33*a* and a second AC application unit 33*b* corresponding to the first module 35*a* and the second module 35*b* of the battery 31. The plurality of AC application units 33 promote heat generation at the internal resistance r of each module 35 by applying alternating currents I to the plurality of modules 35 and increase the temperature of the battery 31.

The AC application unit 33 includes a transformer 41 and an AC power supply 43.

The transformer 41 is connected in parallel between the module 35 of the battery 31 and the AC power supply 43. The transformer 41 includes, for example, a primary coil 41*a* and a secondary coil 41*b* which are magnetically coupled to each other. The transformer 41 transforms the AC power output from the AC power supply 43 depending on the turn ratio of the primary coil 41*a* and the secondary coil 41*b* and applies the transformed AC power to the module 35.

The AC power supply 43 includes, for example, a DC power supply 51 and a bridge circuit 52.

The DC power supply 51 is, for example, a battery or the like.

The bridge circuit 52 includes, for example, a plurality of switching elements and rectifying elements bridge-connected in two phases. The switching element is a transistor such as IGBT or MOSFET. The rectifying element is a diode connected in parallel to each transistor.

Each phase of the bridge circuit 52 includes a pair of high-side arm and low-side arm transistors 52*a* and 52*b* and a free wheeling diode connected in the forward direction from the emitter toward the collector between the collector and the emitter of each of the transistors 52*a* and 52*b*.

The collector of the high-side arm transistor 52*a* is connected to the positive electrode terminal of the DC power supply 51. The emitter of the low-side arm transistor 52*b* is connected to the negative electrode terminal of the DC power supply 51. The emitter of the high-side arm transistor 52*a* and the collector of the low-side arm transistor 52*b* of each phase of two phases are respectively connected to both ends of the primary coil 41*a* of the transformer 41.

The bridge circuit 52 converts the DC power input from the DC power supply 51 into the AC power and outputs the AC power to the transformer 41. The bridge circuit 52 switches the on (conduction)/off (interruption) state of a pair of transistors of each phase based on a gate signal which is a switching command input to the gate of each of the transistors 52*a* and 52*b*.

The plurality of AC power supplies 43 apply alternating currents I having phases set to attenuate the voltage fluctuation at both ends of the battery 31 to the plurality of modules 35. For example, two AC power supplies 43 apply alternating currents I (Bt1) and I (Bt2) having opposite phases offset from each other by 180° to the first module 35*a* and the second module 35*b*. Two AC power supplies 43 cancel the voltage fluctuation at each of both ends of the battery 31.

Figure 4:
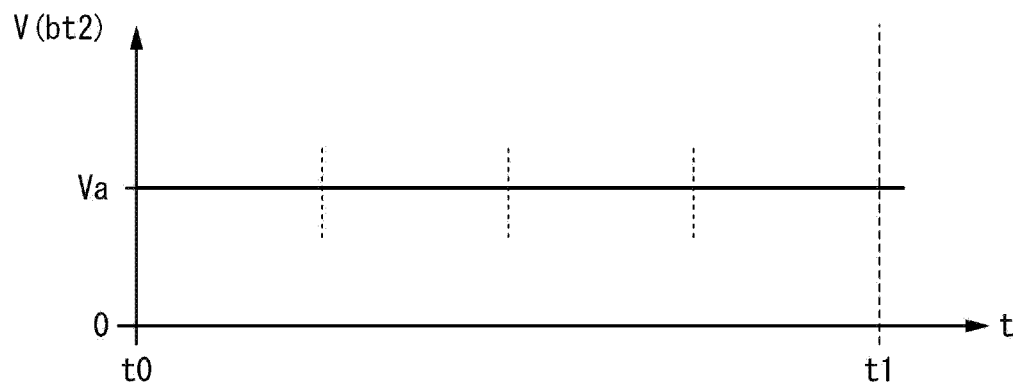
FIG. 4 is a diagram showing a waveform of the alternating current applied to each module of the battery and a waveform of the voltage applied to the positive electrode terminal of the battery of the power storage system of the embodiment of the disclosure.
Figure 4:
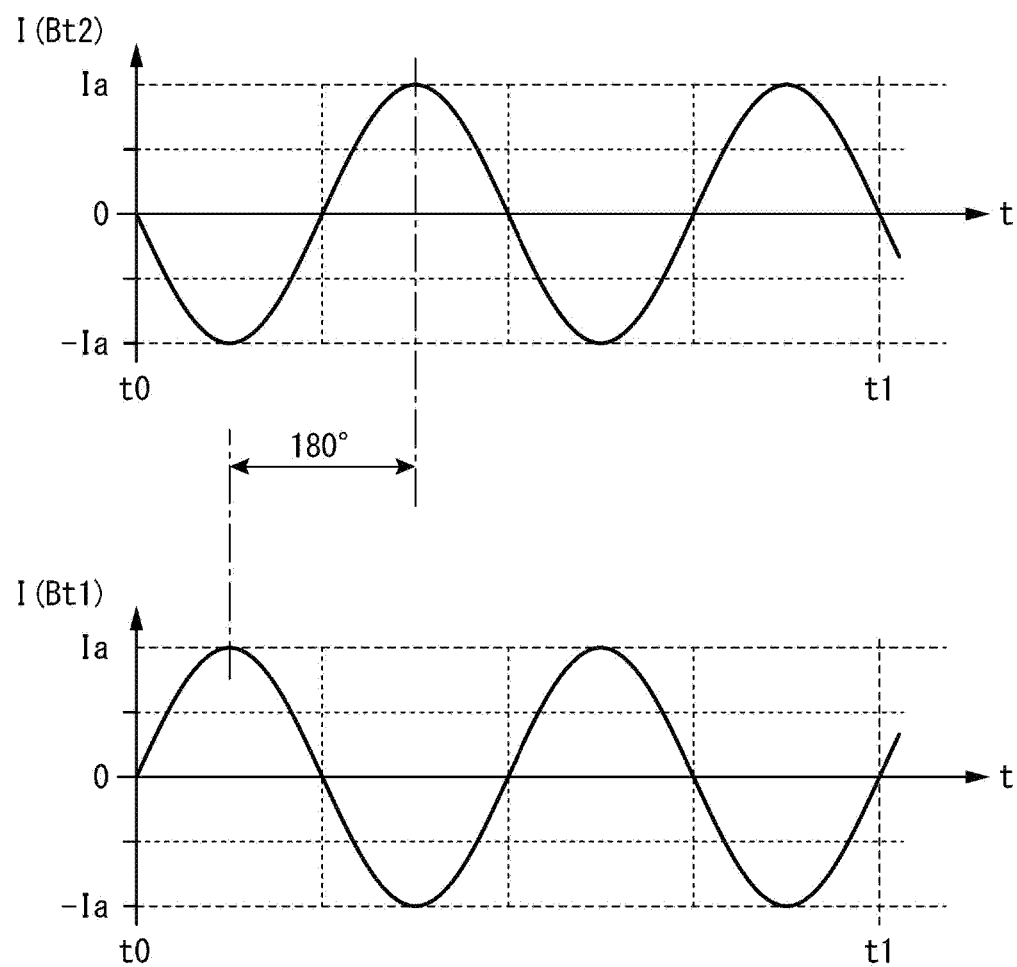

FIG. 4 is a diagram showing a waveform of the alternating current applied to each module 35 of the battery 31 and a waveform of the voltage applied to the positive electrode terminal BP of the battery 31 of the power storage system 10 of the embodiment.

As shown in FIG. 4, the amplitudes of each of the alternating current I (Bt1) of the first module 35*a* and the alternating current I (Bt2) of the second module 35*b* is the same predetermined amplitude Ia and their phases are offset from each other by 180°. The voltage fluctuation at the positive electrode terminal BP of the battery 31 caused by two AC power supplies 43 is canceled and a voltage V (bt2) of the positive electrode terminal BP is a predetermined voltage Va.

As described above, since the power storage system 10 of the embodiment includes two AC application units 33 that apply the alternating currents I (Bt1) and I (Bt2) having opposite phases offset from each other by 180° to the first module 35a and the second module 35b formed by dividing the battery 31 into two parts, it is possible to attenuate the voltage fluctuation at both ends of the battery 31. Since the voltage fluctuation at both ends of the battery 31 is attenuated, it is possible to suppress an alternating current from flowing to the first smoothing capacitor 24 connected in parallel to the battery 31. Since a decrease in the alternating current flowing through the battery 31 is suppressed, it is possible to appropriately promote an increase in temperature of the battery 31 by heat generation at the internal resistance r of the battery 31.

MODIFIED EXAMPLES

Hereinafter, modified examples of the embodiment will be described. The same parts as those in the above-described embodiment are designated by the same reference numerals, and the description thereof will be omitted or simplified.

First Modified Example

In the above-described embodiment, although it has been described that the battery 31 includes the first module 35a and the second module 35b formed by dividing the string 31b into two parts, the disclosure is not limited thereto.

The battery 31 may include n modules 35 formed by dividing the string 31b into n by any natural number n of 3 or more. In this case, the power storage system 10 includes n AC application units 33 provided as many as n modules 35 of the battery 31. The AC power supplies 43 of n AC application units 33 apply the alternating currents I having the phases sequentially offset from each other by (360°/n) to n modules 35 to cancel the voltage fluctuation at each of both ends of the battery 31.

Figure 5:
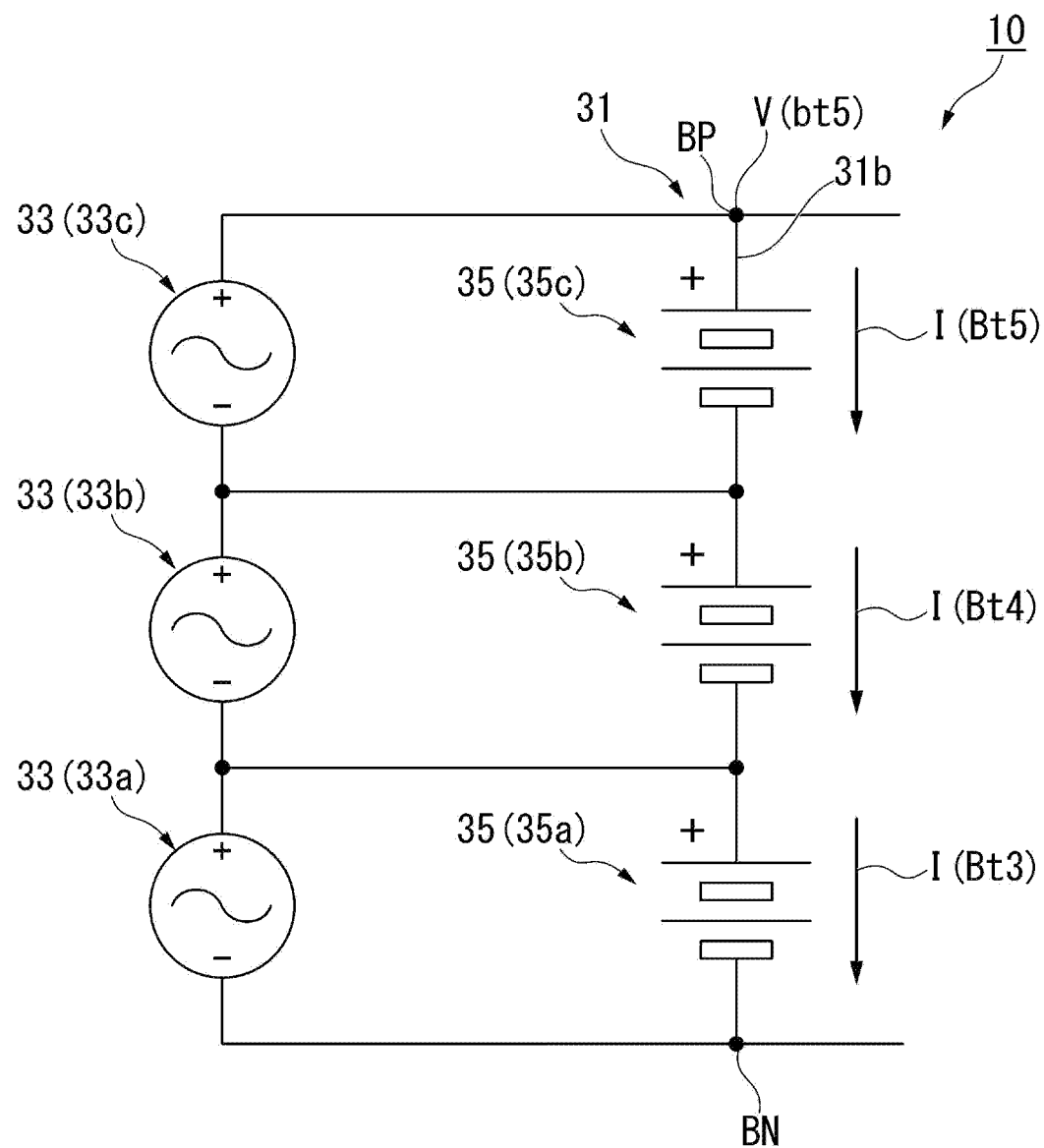
FIG. 5 is a diagram showing an alternating current applied to each module of a battery and a voltage applied to a positive electrode terminal of the battery of a power storage system of a first modified example of the embodiment of the disclosure.

FIG. 5 is a diagram showing an alternating current applied to each module 35 of the battery 31 and a voltage applied to the positive electrode terminal BP of the battery 31 of the power storage system 10 of the first modified example of the embodiment.

As shown in FIG. 5, the power storage system 10 of the first modified example includes three modules 35 which are formed by dividing the string 31b of the battery 31 into three parts and three AC application units 33. Three modules 35 are a first module 35a, a second module 35b, and a third module 35c which are connected in series from the negative electrode terminal BN toward the positive electrode terminal BP of the battery 31. Three AC application units 33 are a first AC application unit 33a, a second AC application unit 33b, and a third AC application unit 33c which are sequentially connected in parallel to correspond to the first module 35a, the second module 35b, and the third module 35c.

The first AC application unit 33a, the second AC application unit 33b, and the third AC application unit 33c apply alternating currents I (Bt3), I (Bt4), and I (Bt5) having the phases sequentially offset from each other by 120° (=360°/3) to the first module 35a, the second module 35b and the third module 35c.

Figure 6:
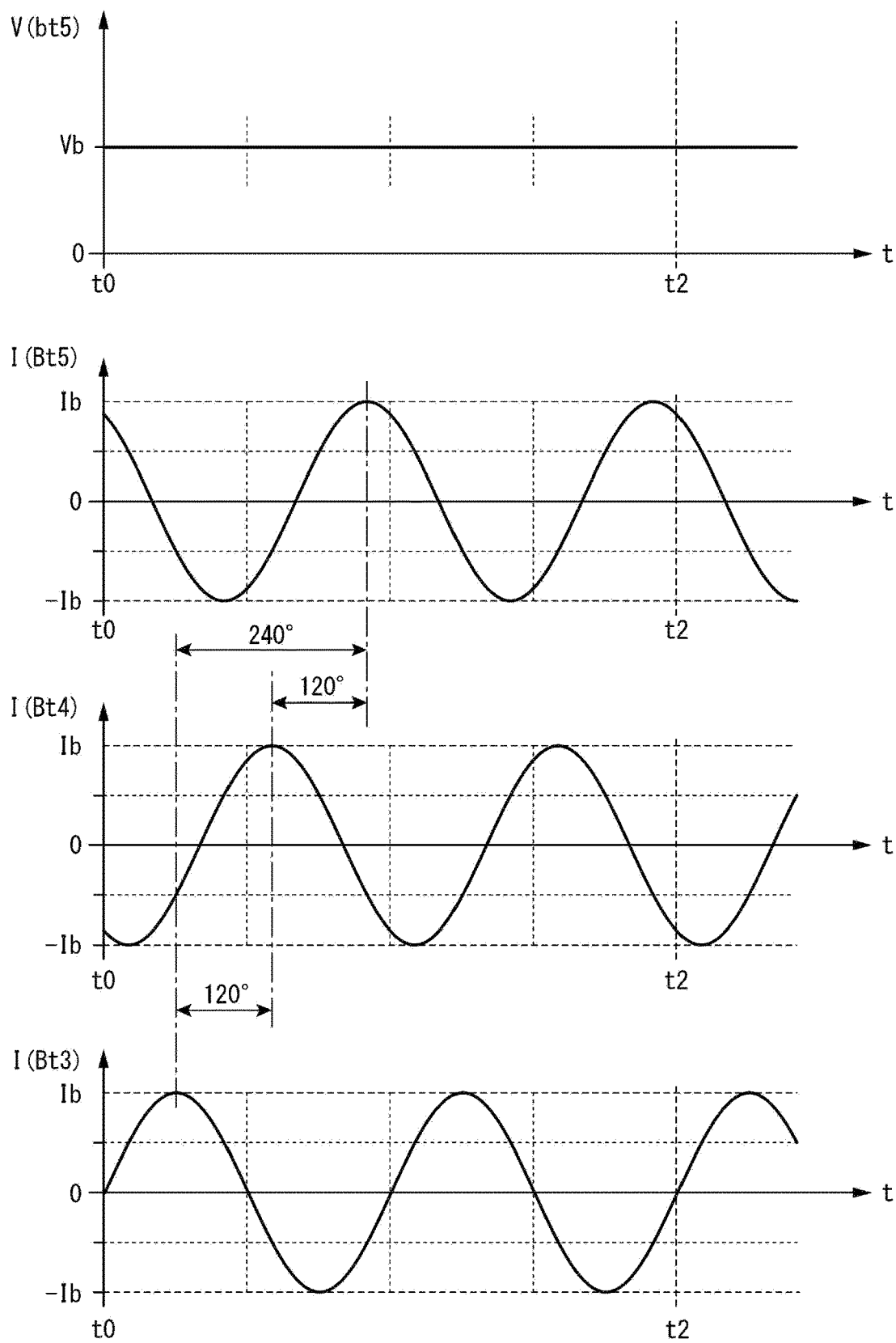
FIG. 6 is a diagram showing a waveform of the alternating current applied to each module of the battery and a waveform of the voltage applied to the positive electrode terminal of the battery of the power storage system of the first modified example of the embodiment of the disclosure.

FIG. 6 is a diagram showing a waveform of the alternating current applied to each module 35 of the battery 31 and a waveform of the voltage applied to the positive electrode terminal BP of the battery 31 of the power storage system 10 of the first modified example of the embodiment.

As shown in FIG. 6, the amplitudes of each of the alternating current I (Bt3) of the first module 35a, the alternating current I (Bt4) of the second module 35b, and the alternating current I (Bt5) of the third module 35c is the same predetermined amplitude Ib and their phases are offset from each other by 120°. The voltage fluctuation at the positive electrode terminal BP of the battery 31 caused by three AC application units 33 is canceled and a voltage V (bt5) of the positive electrode terminal BP is a predetermined voltage Vb.

Second Modified Example

Figure 7:
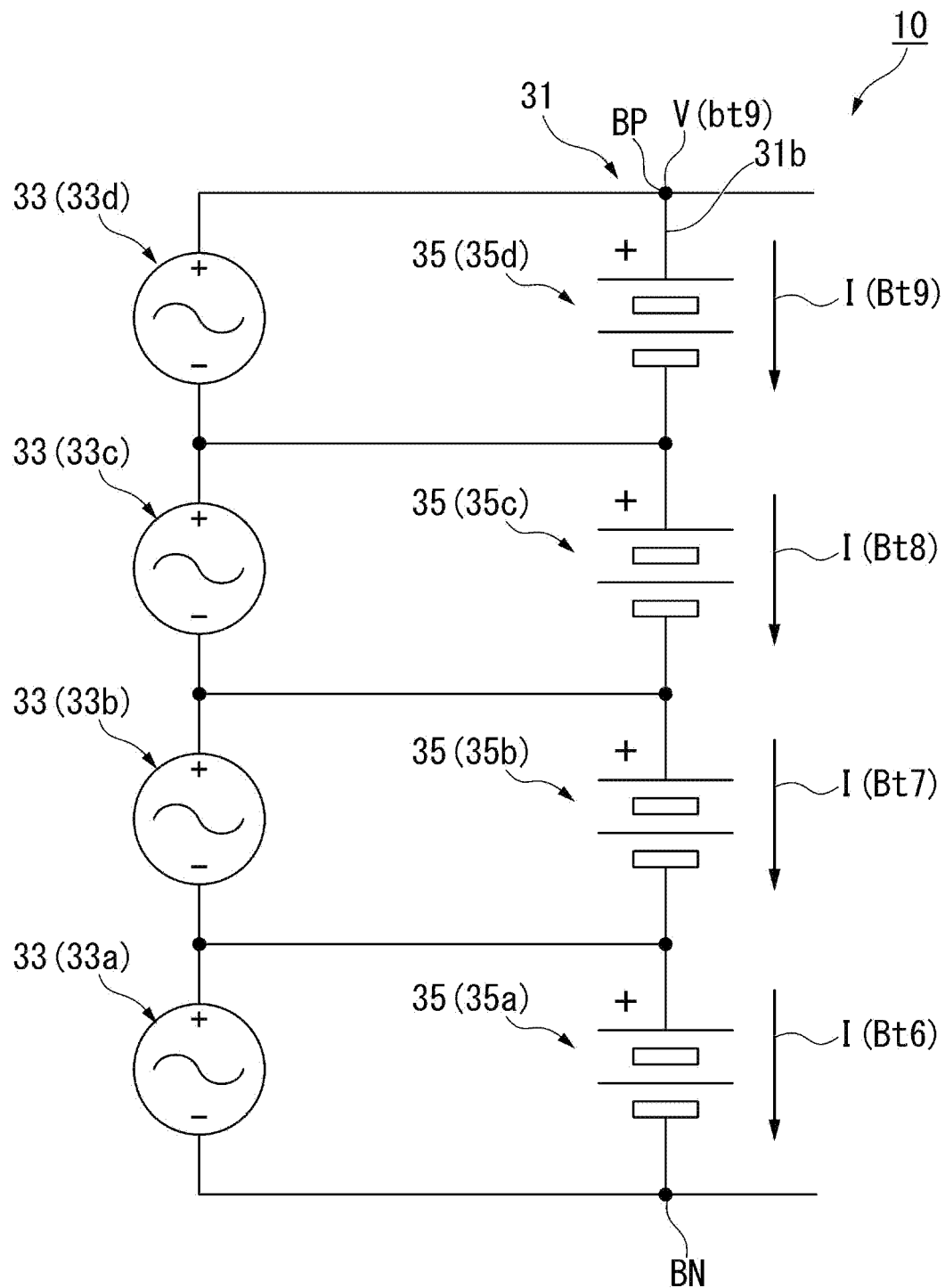
FIG. 7 is a diagram showing an alternating current applied to each module of a battery and a voltage applied to a positive electrode terminal of the battery of a power storage system of a second modified example of the embodiment of the disclosure.

FIG. 7 is a diagram showing an alternating current applied to each module 35 of the battery 31 and a voltage applied to the positive electrode terminal BP of the battery 31 of the power storage system 10 of the second modified example of the embodiment.

As shown in FIG. 7, the power storage system 10 of the second modified example includes four modules 35 which are formed by dividing the string 31b of the battery 31 into four parts and four AC application units 33. Four modules 35 are a first module 35a, a second module 35b, a third module 35c, and a fourth module 35d which are sequentially connected in series from the negative electrode terminal BN toward the positive electrode terminal BP of the battery 31. Four AC application units 33 are a first AC application unit 33a, a second AC application unit 33b, a third AC application unit 33c, and a fourth AC application unit 33d which are sequentially connected in parallel to correspond to the first module 35a, the second module 35b, the third module 35c, and the fourth module 35d.

The first AC application unit 33a, the second AC application unit 33b, the third AC application unit 33c, and the fourth AC application unit 33d apply alternating currents I (Bt6), I (Bt7), I (Bt8), and I (Bt9) having phases sequentially offset from each other by 90° (=360°/4) to the first module 35a, the second module 35b, the third module 35c, and the fourth module 35d.

Figure 8:
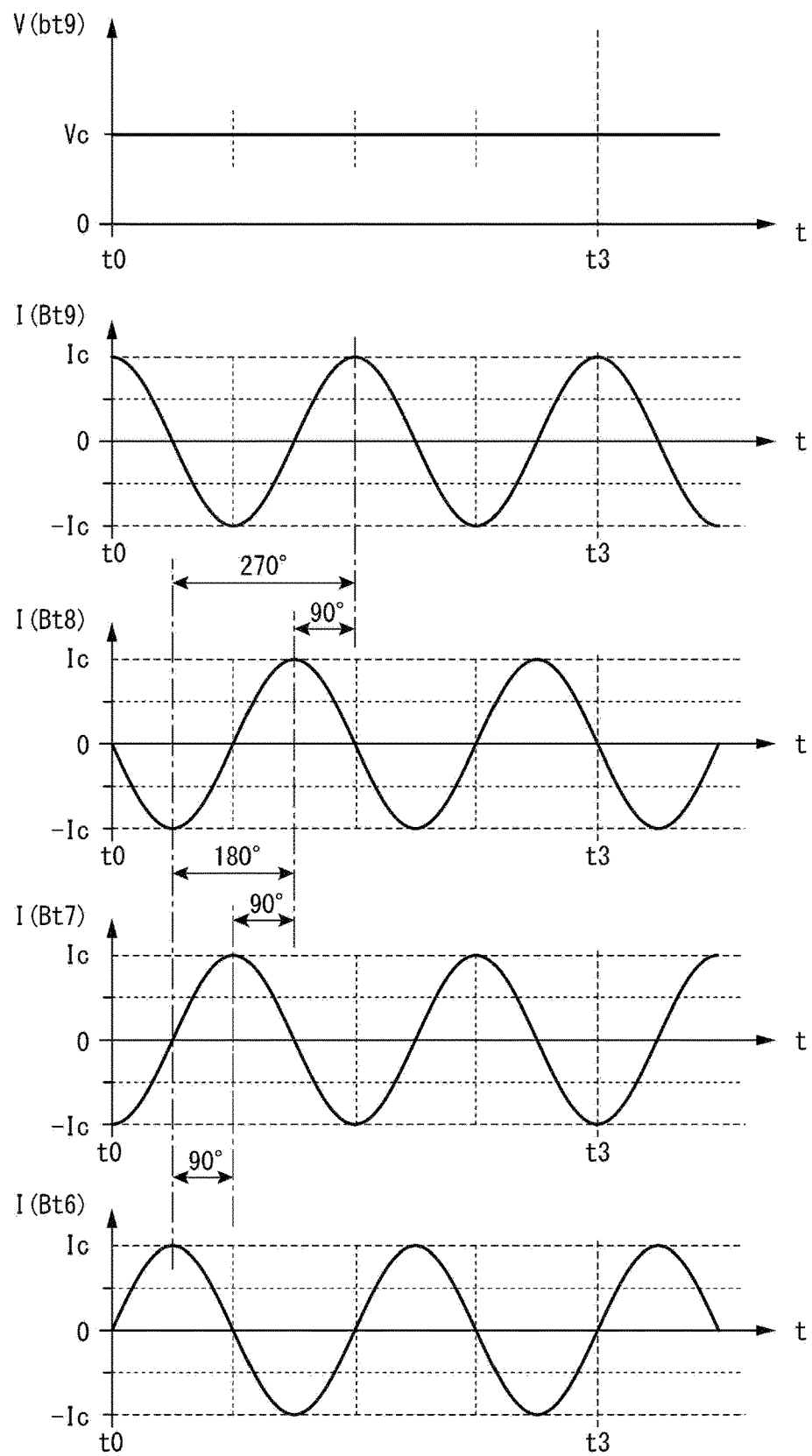
FIG. 8 is a diagram showing a waveform of the alternating current applied to each module of the battery and a waveform of the voltage applied to the positive electrode terminal of the battery of the power storage system of the second modified example of the embodiment of the disclosure.

FIG. 8 is a diagram showing a waveform of the alternating current applied to each module 35 of the battery 31 and a waveform of a voltage applied to the positive electrode terminal BP of the battery 31 of the power storage system 10 of the second modified example of the embodiment.

As shown in FIG. 8, the amplitudes of each of the alternating current I (Bt6) of the first module 35a, the alternating current I (Bt7) of the second module 35b, the alternating current I (Bt8) of the third module 35c, and the alternating current I (Bt9) of the fourth module 35d is the same predetermined amplitude Ic and their phases are sequentially offset from each other by 90°. The voltage fluctuation at the positive electrode terminal BP of the battery 31 caused by four AC application units 33 is canceled and a voltage V (bt9) of the positive electrode terminal BP is a predetermined voltage Vc.

Third Modified Example

Figure 9:
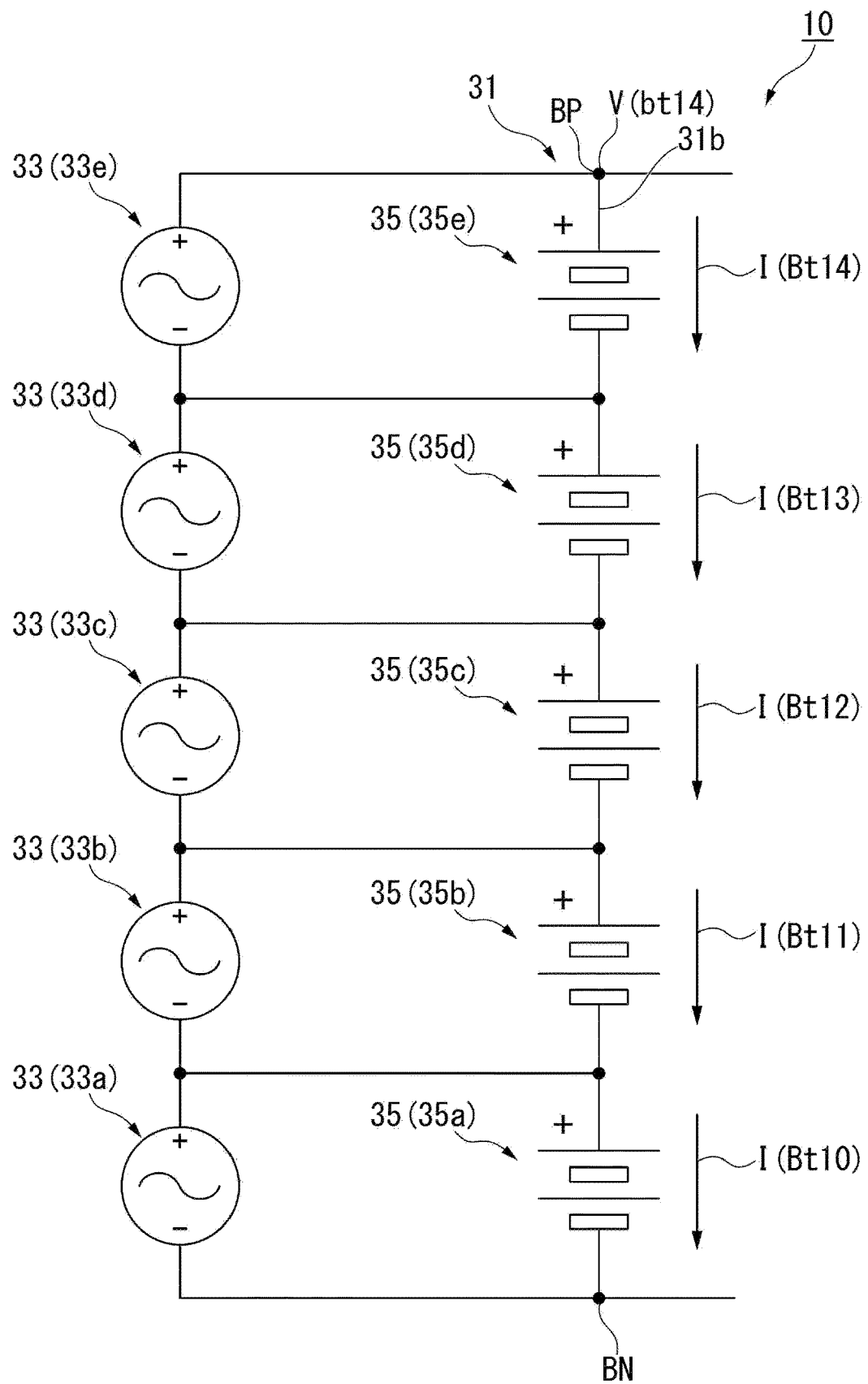
FIG. 9 is a diagram showing an alternating current applied to each module of a battery and a voltage applied to a positive electrode terminal of the battery of a power storage system of a third modified example of the embodiment of the disclosure.

FIG. 9 is a diagram showing an alternating current applied to each module 35 of the battery 31 and a voltage applied to the positive electrode terminal BP of the battery 31 of the power storage system 10 of a third modified example of the embodiment.

As shown in FIG. 9, the power storage system 10 of the third modified example includes five modules 35 which are formed by dividing the string 31b of the battery 31 into five parts and five AC application units 33. Five modules 35 are a first module 35a, a second module 35b, a third module 35c, a fourth module 35d, and a fifth module 35e which are sequentially connected in series from the negative electrode terminal BN toward the positive electrode terminal BP of the battery 31. Five AC application units 33 are a first AC application unit 33a, a second AC application unit 33b, a third AC application unit 33c, a fourth AC application unit 33d, and a fifth AC application unit 33e which are sequentially connected in parallel to correspond to the first module 35a, the second module 35b, the third module 35c, the fourth module 35d, and the fifth module 35e.

The first AC application unit 33a, the second AC application unit 33b, the third AC application unit 33c, the fourth AC application unit 33d, and the fifth AC application unit 33e apply alternating currents I (Bt10), I (Bt11), I (Bt12), I (Bt13), and I (Bt14) having the phases sequentially offset from each other by 72° (=360°/5) to the first module 35a, the second module 35b, the third module 35c, the fourth module 35d, and the fifth module 35e.

Figure 10:
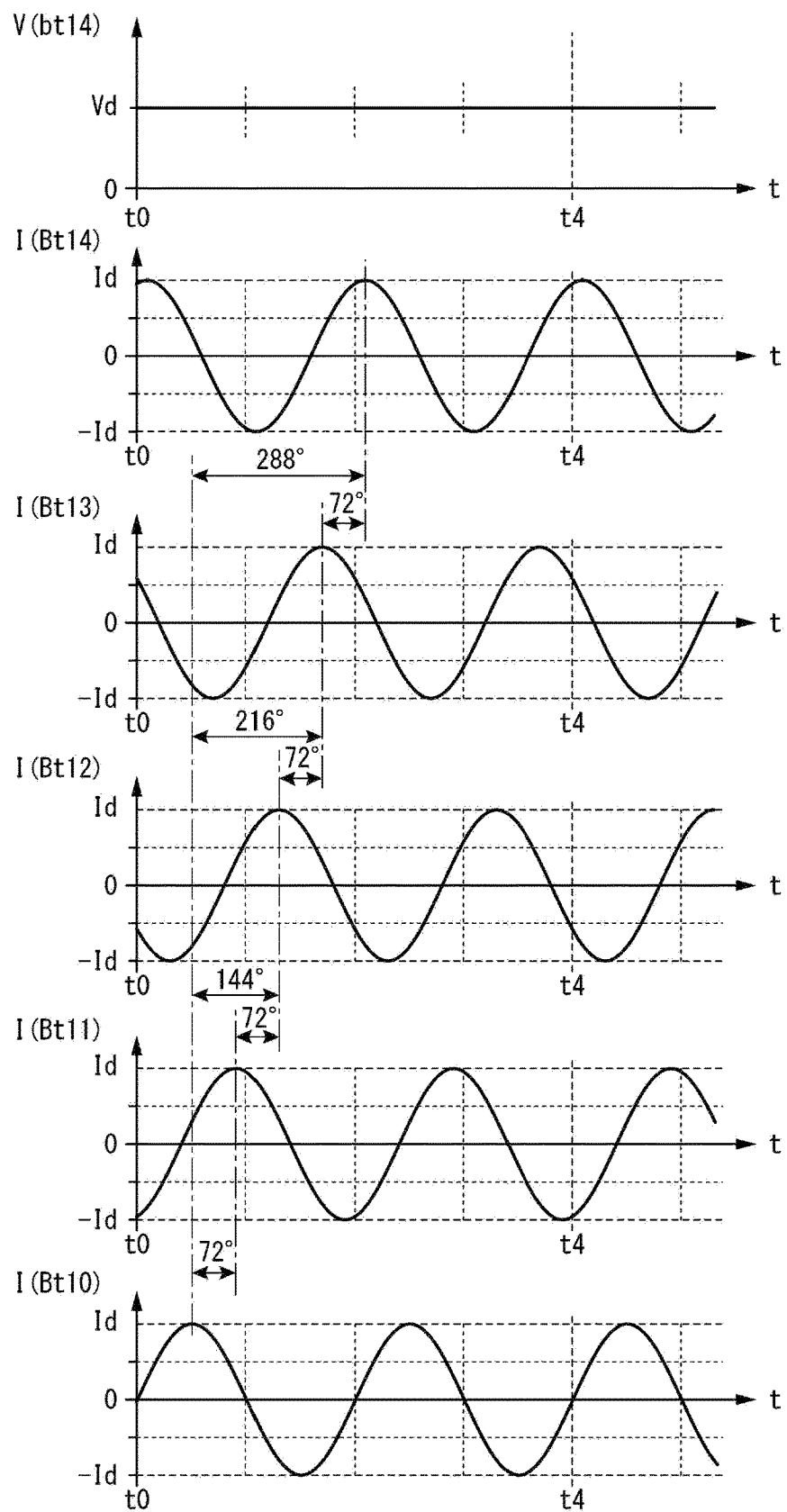
FIG. 10 is a diagram showing a waveform of the alternating current applied to each module of the battery and a waveform of the voltage applied to the positive electrode terminal of the battery of the power storage system of the third modified example of the embodiment of the disclosure.

FIG. 10 is a diagram showing a waveform of the alternating current applied to each module 35 of the battery 31 and a waveform of a voltage applied to the positive electrode terminal BP of the battery 31 of the power storage system 10 of the third modified example of the embodiment.

As shown in FIG. 10, the amplitude of each of the alternating current I (Bt10) of the first module 35a, the alternating current I (Bt11) of the second module 35b, the alternating current I (Bt12) of the third module 35c, the alternating current I (Bt13) of the fourth module 35d, and the alternating current I (Bt14) of the fifth module 35e is the same predetermined amplitude Id and their phases are sequentially offset from each other by 72°. The voltage fluctuation at the positive electrode terminal BP of the battery 31 caused by five AC application units 33 is canceled and a voltage V (bt14) of the positive electrode terminal BP is a predetermined voltage Vd.

According to each of the first modified example, the second modified example, and the third modified example, it is possible to suppress an increase in the withstand voltage and cost of the AC application unit 33 by increasing the number of divisions of the battery 31, that is, the number of the plurality of AC application units 33 respectively applying the alternating currents I to the plurality of modules 35.

It is possible to cancel the voltage fluctuation generated at both ends of each module 35 and to attenuate the voltage fluctuation at both ends of the battery 31 by applying the alternating currents I having the phases sequentially offset from each other by (360°/n) to n modules 35.

Fourth Modified Example

In the first modified example of the above-described embodiment, it has been described that the battery 31 includes n modules 35 which are formed by dividing the string 31b into n parts and the AC power supplies 43 of n AC application units 33 apply the alternating currents I having the phases sequentially offset from each other by (360°/n) to n modules 35, but the disclosure is not limited thereto.

The battery 31 may include 2 k modules 35 which are formed by dividing the string 31b into 2 k parts by any natural number k. 2 k modules 35 are formed as a pair by two modules 35 that are sequentially separated from each other to form k pair of module pairs 61. The power storage system 10 includes 2 k AC application units 33 which are provided as many as 2 k modules 35 of the battery 31. The AC power supplies 43 of 2 k AC application units 33 apply the alternating currents I having phases offset from each other by 180° to two modules 35 in each of k module pairs 61. Additionally, the phases of the alternating currents I of two modules 35 of the k mutual module pairs 61 are the phases having the same combination between the k module pairs 61. Accordingly, the voltage fluctuation at both ends of two adjacent modules 35 in each of the k module pairs 61 is canceled and the voltage fluctuation at both ends of the battery 31 is canceled.

Figure 11:
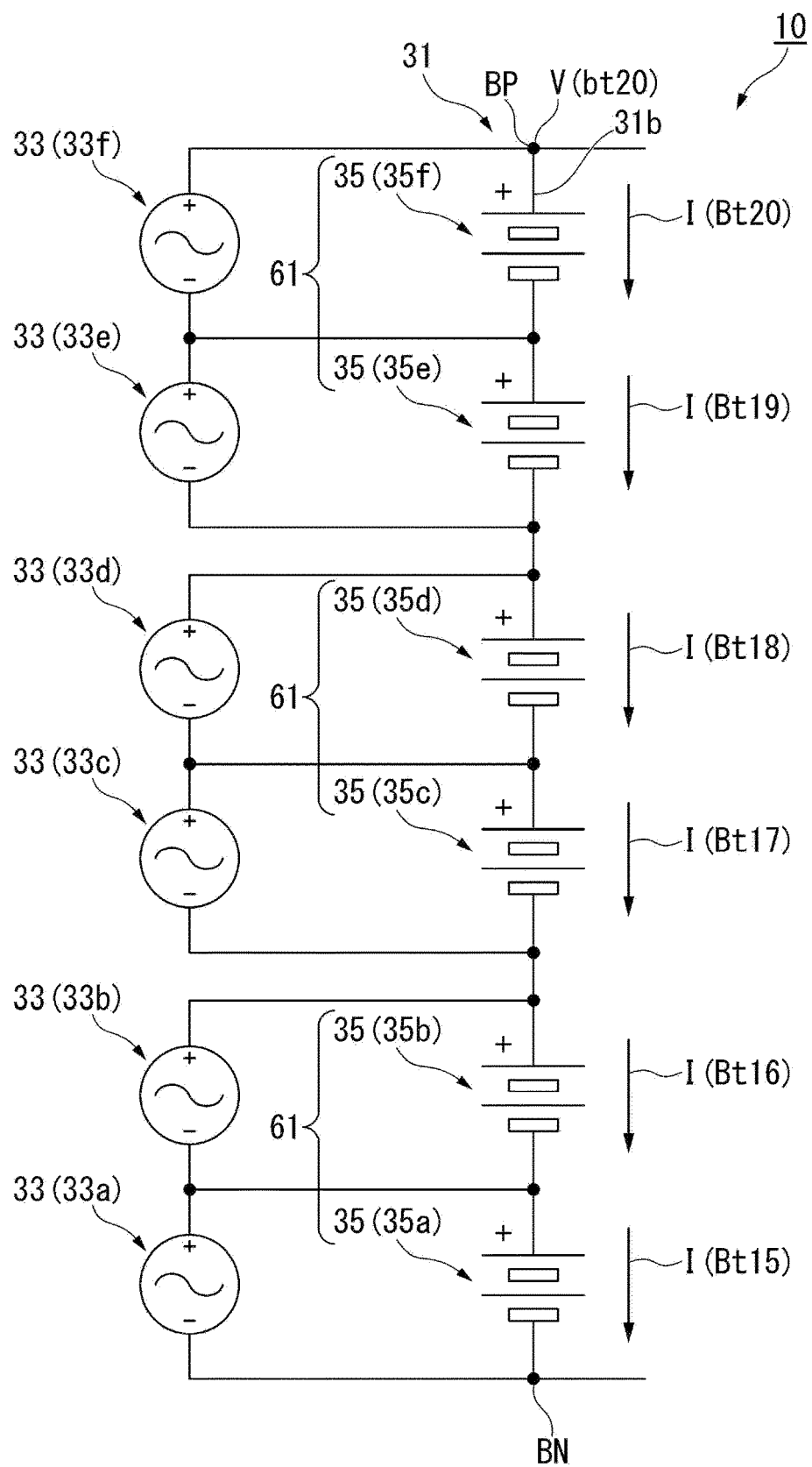
FIG. 11 is a diagram showing an alternating current applied to each module of a battery and a voltage applied to a positive electrode terminal of the battery of a power storage system of a fourth modified example of the embodiment of the disclosure.

FIG. 11 is a diagram showing an alternating current applied to each module 35 of the battery 31 and a voltage applied to the positive electrode terminal BP of the battery 31 of the power storage system 10 of the fourth modified example of the embodiment.

As shown in FIG. 11, the power storage system 10 of the fourth modified example includes six modules 35 which are formed by dividing the string 31b of the battery 31 into 6 (=2×3) parts and six AC application units 33. Six modules 35 are a first module 35a, a second module 35b, a third module 35c, a fourth module 35d, a fifth module 35e, and a sixth module 35f which are sequentially connected in series from the negative electrode terminal BN toward the positive electrode terminal BP of the battery 31. Six AC application units 33 are a first AC application unit 33a, a second AC application unit 33b, a third AC application unit 33c, a fourth AC application unit 33d, a fifth AC application unit 33e, and a sixth AC application unit 33f which are sequentially connected in parallel to correspond to the first module 35a, the second module 35b, the third module 35c, the fourth module 35d, the fifth module 35e, and the sixth module 35f.

The first AC application unit 33a and the second AC application unit 33b apply alternating currents I (Bt15) and I (Bt16) having opposite phases offset from each other by 180° to the first module 35a and the second module 35b which are formed as a pair. The third AC application unit 33c and the fourth AC application unit 33d apply alternating currents I (Bt17) and I (Bt18) having opposite phases offset from each other by 180° to the third module 35c and the fourth module 35d which are formed as a pair. The fifth AC application unit 33e and the sixth AC application unit 33f apply alternating currents I (Bt19) and I (Bt20) having opposite phases offset from each other by 180° to the fifth module 35e and the sixth module 35f which are formed as a pair.

Additionally, the alternating currents I (Bt15), I (Bt17), and I (Bt19) caused by the first AC application unit 33a, the third AC application unit 33c, and the fifth AC application unit 33e have the same phases. The alternating currents I (Bt16), I (Bt18), and I (Bt20) caused by the second AC application unit 33b, the fourth AC application unit 33d, and the sixth AC application unit 33f have the same phases.

Figure 12:
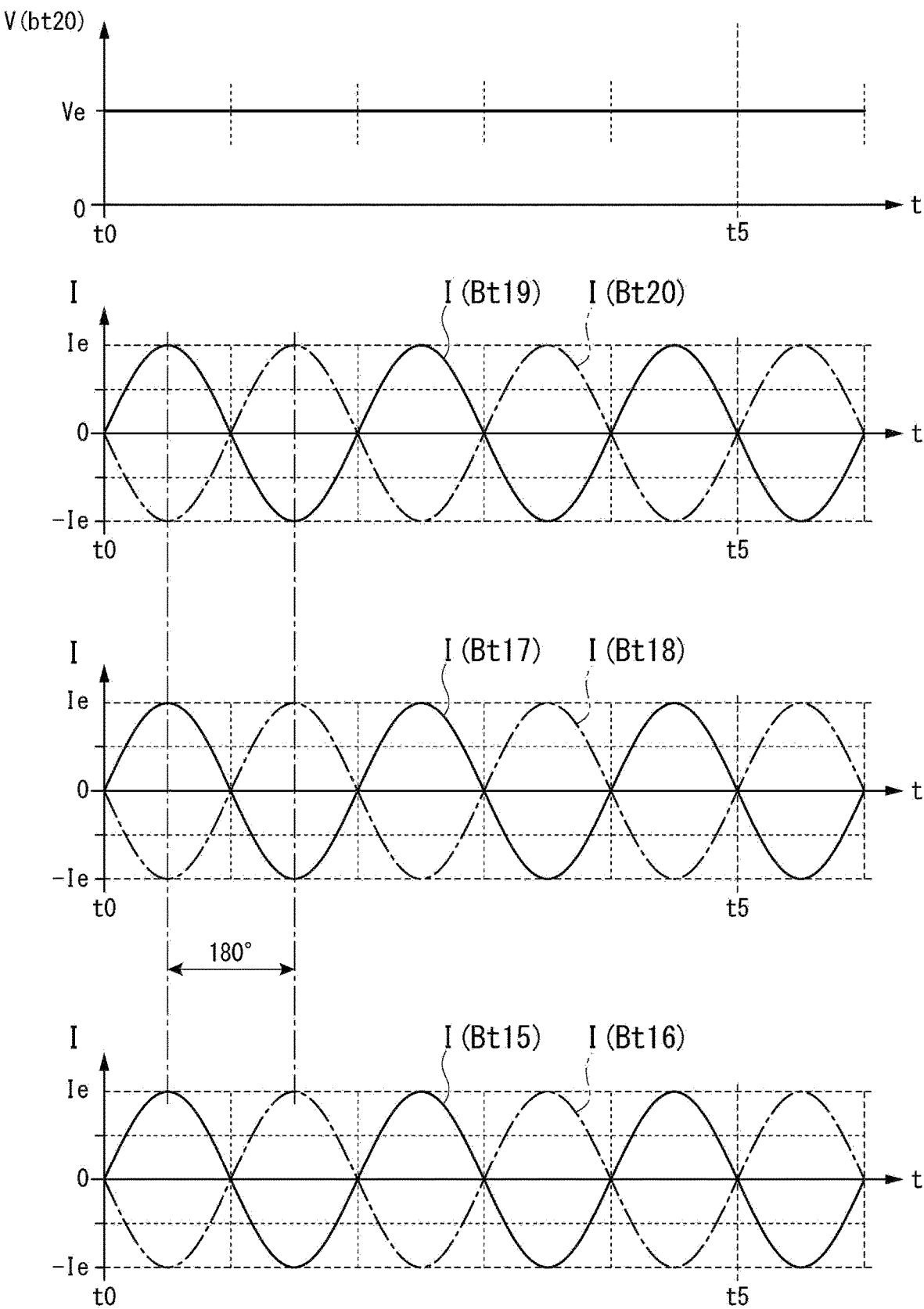
FIG. 12 is a diagram showing a waveform of the alternating current applied to each module of the battery and a waveform of the voltage applied to the positive electrode terminal of the battery of the power storage system of the fourth modified example of the embodiment of the disclosure.

FIG. 12 is a diagram showing a waveform of the alternating current applied to each of the modules 35 of the battery 31 and a waveform of the voltage applied to the positive electrode terminal BP of the battery 31 of the power storage system 10 of the fourth modified example of the embodiment.

As shown in FIG. 12, the amplitude of each of the alternating current I (Bt15) of the first module 35a, the alternating current I (Bt16) of the second module 35b, the alternating current I (Bt17) of the third module 35c, the alternating current I (Bt18) of the fourth module 35d, the alternating current I (Bt19) of the fifth module 35e, and the alternating current I (Bt20) of the sixth module 35f is the same predetermined amplitude Ie. The alternating currents I (Bt15), I (Bt17), and I (Bt19) have the same phases and the alternating currents I (Bt16), I (Bt18), and I (Bt20) have the same phases which are opposite phases offset from the phases of the alternating currents I (Bt15), I (Bt17), and I (Bt19) by 180°. Since the voltage at both ends of two adjacent modules 35 in each of three pairs of module pairs 61 is canceled, the voltage fluctuation at the positive electrode terminal BP of the battery 31 caused by six AC application units 33 is canceled and a voltage V (bt20) of the positive electrode terminal BP is a predetermined voltage Ve.

According to the fourth modified example, since the alternating currents I having the phases sequentially offset from each other by (360°/2) are applied to two modules 35 of each of k pairs of module pairs 61, the voltage fluctuation generated at both ends of two continuously adjacent modules 35 is canceled and the voltage fluctuation at both ends of the battery 31 can be attenuated.

Since the alternating currents I having the same combination between k module pairs 61 are applied to two modules 35 of the k mutual module pairs 61, it is possible to further promote the attenuation of the voltage fluctuation at both ends of the battery 31 when the positive and negative of the alternating currents I are symmetrical.

Fifth Modified Example

In the fourth modified example of the above-described embodiment, although it has been described that the phases of the alternating currents I of two modules 35 of the k mutual module pairs 61 are the phases having the same combination between the k module pairs 61, the disclosure is not limited thereto.

For example, when the positive and negative of the alternating current I applied to each module 35 are asymmetrical, the phases of the alternating currents I of two modules 35 of the k mutual module pairs 61 may be sequentially offset from each other by (360°/2 k) in the k module pairs 61.

Figure 13:
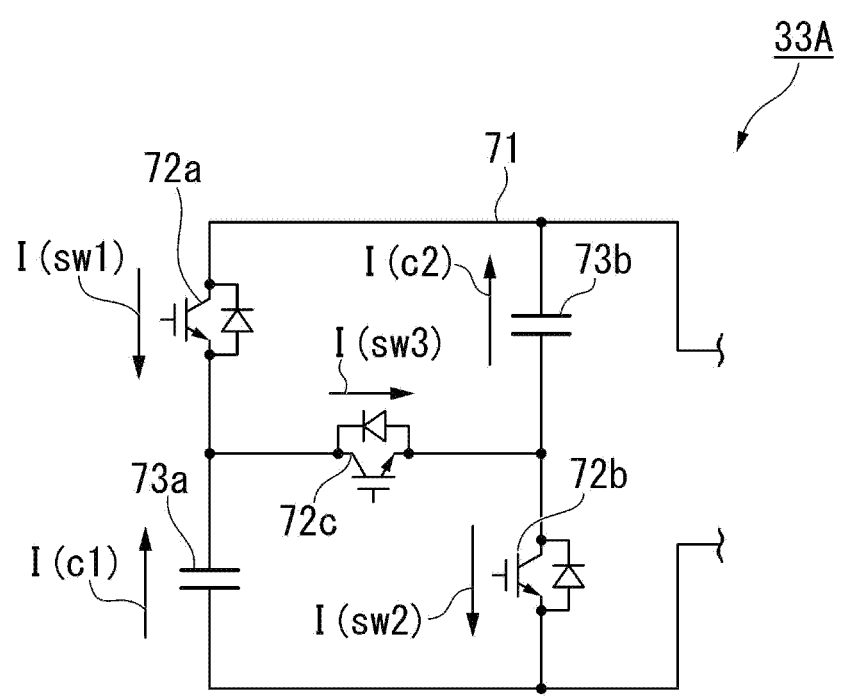
FIG. 13 is a diagram showing a configuration of an AC application unit of a power storage system of a fifth modified example of the embodiment of the disclosure.
Figure 14:
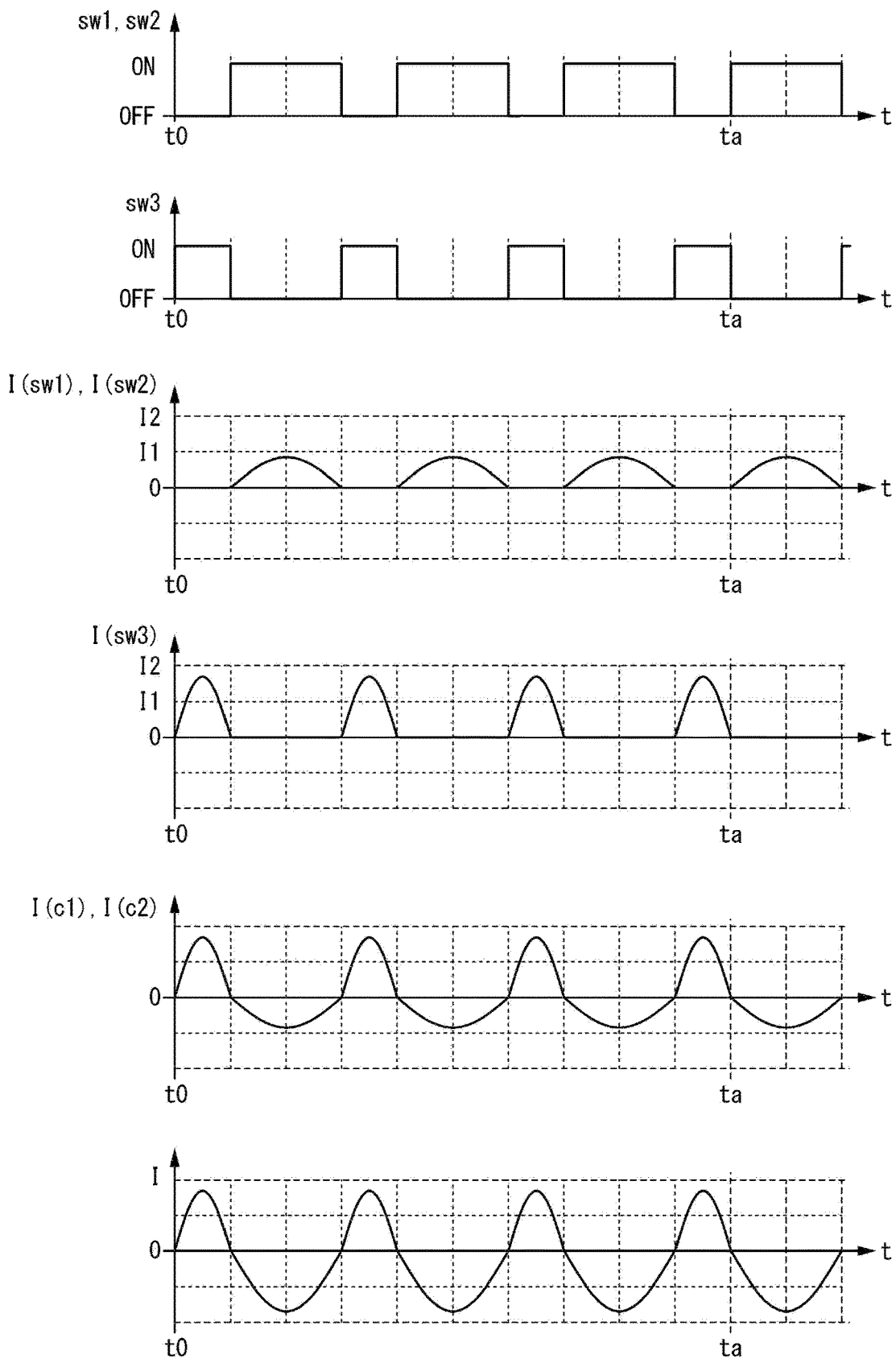
FIG. 14 is a diagram showing a switching operation of the AC application unit, a waveform of a current flowing through each element, and a waveform of an alternating current applied to each module of the power storage system of the fifth modified example of the embodiment of the disclosure.

FIG. 13 is a diagram showing a configuration of an AC application unit 33A of the power storage system 10 of the fifth modified example of the embodiment. FIG. 14 is a diagram showing a switching operation of the AC application unit 33A, a waveform of a current flowing through each element, and a waveform of an alternating current applied to each module 35 of the power storage system 10 of the fifth modified example of the embodiment.

As shown in FIG. 13, the AC application unit 33A of the fifth modified example includes a bridge circuit 71. The bridge circuit 71 includes, for example, a plurality of switching elements and capacitors which are bridge-connected in two phases. The switching element is a transistor such as IGBT or MOSFET.

A first phase of the bridge circuit 71 includes a first switching element (sw1) 72a of a high side arm and a first capacitor (c1) 73a of a low side arm. The collector of the first switching element 72a is connected to the positive electrode terminal of the bridge circuit 71. The first capacitor 73a is connected between the emitter of the first switching element 72a and the negative electrode terminal of the bridge circuit 71.

A second phase of the bridge circuit 71 includes a second capacitor (c2) 73b of a high side arm and a second switching element (sw2) 72b of a low side arm. The emitter of the second switching element 72b is connected to the negative electrode terminal of the bridge circuit 71. The second capacitor 73b is connected between the collector of the second switching element 72b and the positive electrode terminal of the bridge circuit 71.

The bridge circuit 71 includes a third switching element (sw3) 72c which is connected between the first phase and the second phase. The collector of the third switching element 72c is connected to the emitter of the first switching element 72a. The emitter of the third switching element 72c is connected to the collector of the second switching element 72b.

As shown in FIG. 14, the first switching element 72a, the second switching element 72b, and the third switching element 72c switch the on (conduction)/off (interruption) state based on a gate signal which is a switching command input to each gate. For example, the first switching element 72a and the second switching element 72b can be switched to the same state with each other and can be switched to a state having a phase opposite to that of the third switching element 72c. The ratio of on (conduction) to off (interruption) of the first switching element 72a and the second switching element 72b is 2:1 and the ratio of on (conduction) to off (interruption) of the third switching element 72c is 1:2.

The amplitudes of the currents I (sw1) and I (sw2) flowing through the switching elements 72a and 72b when the first switching element 72a and the second switching element 72b are turned on (conducted) are about predetermined values I1. The amplitude of the current I (sw3) flowing through the third switching element 72c when the third switching element 72c is turned on (conducted) is about a predetermined value I2 larger than the predetermined value I1 (for example, twice the predetermined value I1). The positive and the negative of the waveforms of the currents I (c1) and I (c2) respectively flowing through the first capacitor 73a and the second capacitor 73b are asymmetrical and the positive and the negative of the waveform of the alternating current I applied to each module 35 are asymmetrical.

Figure 15:
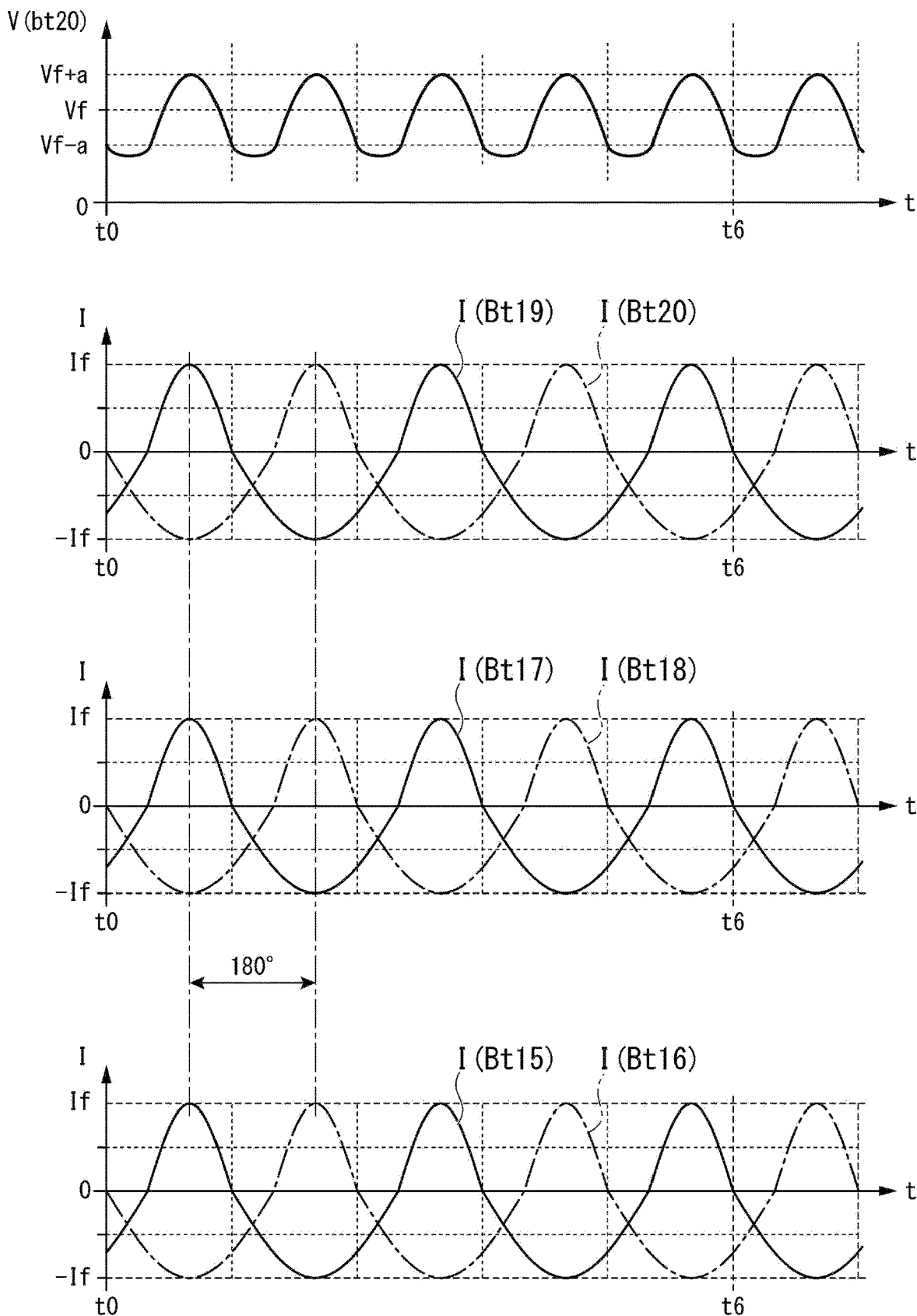
FIG. 15 is a diagram showing a first example of a waveform of an alternating current applied to each module of a battery and a first example of a waveform of a voltage applied to a positive electrode terminal of the battery of a power storage system of a comparative example of the fifth modified example of the embodiment of the disclosure.
Figure 16:
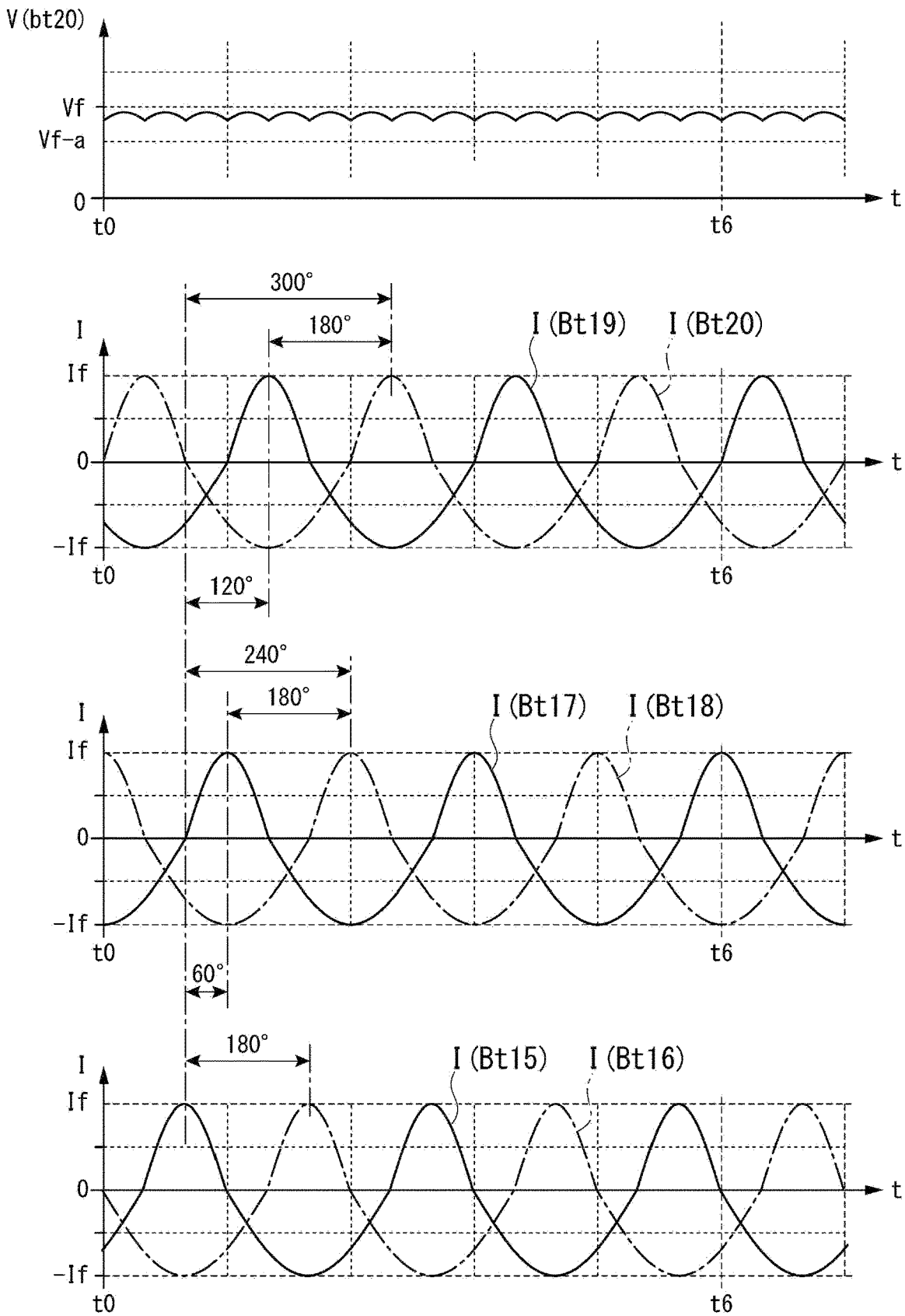
FIG. 16 is a diagram showing a second example of the waveform of the alternating current applied to each module of the battery and a second example of the waveform of the voltage applied to the positive electrode terminal of the battery of the power storage system of the fifth modified example of the embodiment of the disclosure.

FIG. 15 is a diagram showing a waveform of the alternating current applied to each of the modules 35 of the battery 31 and a waveform of the voltage applied to the positive electrode terminal BP of the battery 31 of the power storage system 10 of a comparative example of the fifth modified example of the embodiment. FIG. 16 is a diagram showing a waveform of the alternating current applied to each of the modules 35 of the battery 31 and a waveform of the voltage applied to the positive electrode terminal BP of the battery 31 of the power storage system 10 of the fifth modified example of the embodiment.

As shown in FIGS. 15 and 16, the amplitude of each of the alternating current I (Bt15) of the first module 35a, the alternating current I (Bt16) of the second module 35b, the alternating current I (Bt17) of the third module 35c, the alternating current I (Bt18) of the fourth module 35d, the alternating current I (Bt19) of the fifth module 35e, and the alternating current I (Bt20) of the sixth module 35f is the same predetermined amplitude If.

In the comparative example shown in FIG. 15, when the positive and the negative of the alternating current I applied to each of the modules 35 are asymmetrical, the phases of the alternating currents I of two modules 35 of the k mutual module pairs 61 are the phases having the same combination between the k module pairs 61 similarly to the above-described fourth modified example. The alternating currents I (Bt15), I (Bt17), and I (Bt19) have the same phases and the alternating currents I (Bt16), I (Bt18), and I (Bt20) have the same phases which are opposite phases offset from the phases of the alternating currents I (Bt15), I (Bt17), and I (Bt19) by 180°. The cancellation of the voltage fluctuation at both ends of two adjacent modules 35 of three module pairs 61 is suppressed and the cancellation of the voltage fluctuation at the positive electrode terminals BP of the batteries 31 of six AC application units 33 is suppressed. The voltage V (bt20) of the positive electrode terminal BP fluctuates, for example, above and below a predetermined voltage Vf in the range of a predetermined value a (Vf–a to Vf+a).

Compared to the comparative example shown in FIG. 15, in the fifth modified example shown in FIG. 16, when the positive and the negative of the alternating current I applied to each of the modules 35 are asymmetrical, the phases of the alternating currents I of two modules 35 of the k mutual module pairs 61 are sequentially offset from each other by (360°/2k) in the k module pairs 61. The phases of three alternating currents I (Bt15), I (Bt17), and I (Bt19) are sequentially offset from each other by 60° (=360°/6). The phases of three alternating currents I (Bt16), I (Bt18), and I (Bt20) are sequentially offset from each other by 60° (=360°/6) and are offset from the phases of the alternating currents I (Bt15), I (Bt17), and I (Bt19) by 180°. The voltage fluctuation at both ends of two adjacent modules 35 of each of three module pairs 61 is suppressed compared to the comparative example shown in FIG. 15 and the voltage fluctuation at the positive electrode terminal BP of the battery 31 caused by six AC application units 33 is suppressed. The voltage V (bt20) of the positive electrode terminal BP fluctuates, for example, below the predetermined voltage Vf in the range of the predetermined value a (Vf-a to Vf).

According to the fifth modified example, since the alternating currents I having phases offset from each other by (360°/(2×k)) in the k module pairs 61 are sequentially applied to two modules 35 of the k mutual module pairs 61, it is possible to further promote the attenuation of the voltage fluctuation at both ends of the battery 31 when the positive and the negative of the alternating current I are asymmetrical.

Sixth Modified Example

In the fourth modified example of the above-described embodiment, although it has been described that the battery 31 includes 2 k modules 35 which are formed by dividing the string 31b into 2 k parts by any natural number k, the disclosure is not limited thereto.

The battery 31 may include (m×k) modules 35 which are formed by dividing the string 31b into (m×k) parts by any natural number k and any natural number m of 3 or more. (m×k) modules 35 are formed as a pair by m modules 35 which are sequentially adjacent to each other to form k module sets 81. The power storage system 10 includes (m×k) AC application units 33 which are provided as many as (m×k) modules 35 of the battery 31. The AC power supplies 43 of (m×k) AC application units 33 apply the alternating currents I having the phases sequentially offset from each other by (360°/k) to m modules 35 in each of k module sets 81. Additionally, the phases of the alternating currents I of m modules 35 of k mutual module sets 81 are the phases having the same combination between k module sets 81. Accordingly, the voltage fluctuation at both ends of m adjacent modules 35 in each of the k module sets 81 is canceled and the voltage fluctuation at both ends of the battery 31 is canceled.

Figure 17:
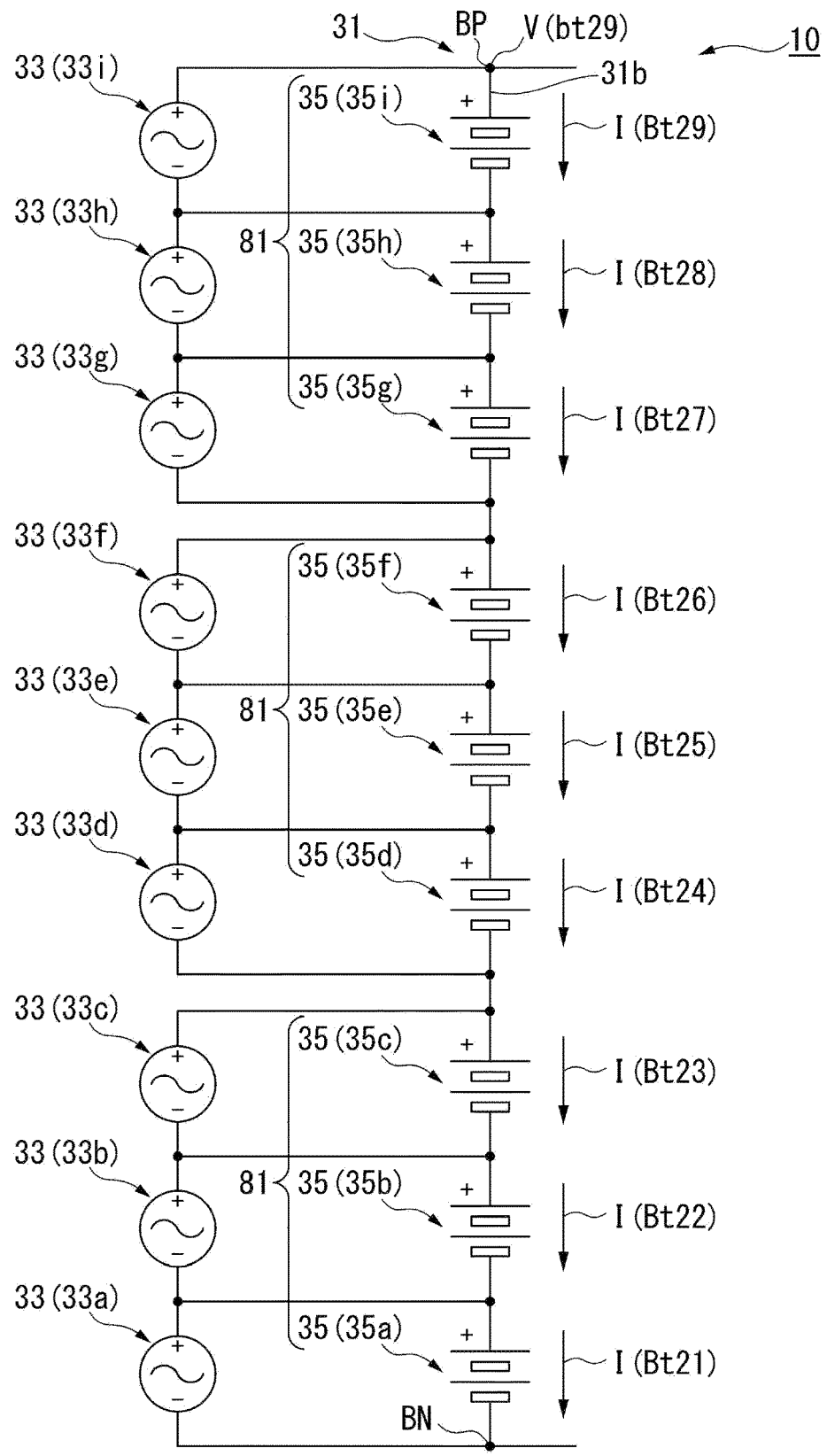
FIG. 17 is a diagram showing an alternating current applied to each module of a battery and a voltage applied to a positive electrode terminal of the battery of a power storage system of a sixth modified example of the embodiment of the disclosure.

FIG. 17 is a diagram showing an alternating current applied to each module 35 of the battery 31 and a voltage applied to the positive electrode terminal BP of the battery 31 in the power storage system 10 of the sixth modified example of the embodiment.

As shown in FIG. 17, the power storage system 10 of the sixth modified example includes nine modules 35 which are formed by dividing the string 31b of the battery 31 into 9 (=3×3) parts and nine AC application units 33. Nine modules 35 are a first module 35a, a second module 35b, a third module 35c, a fourth module 35d, a fifth module 35e, a sixth module 35f, a seventh module 35g, an eighth module 35h, and a ninth module 35i which are sequentially connected in series from the negative electrode terminal BN toward the positive electrode terminal BP of the battery 31. Nine AC application units 33 are a first AC application unit 33a, a second AC application unit 33b, a third AC application unit 33c, a fourth AC application unit 33d, a fifth AC application unit 33e, a sixth AC application unit 33f, a seventh AC application unit 33g, an eighth AC application unit 33h, and a ninth AC application unit 33i which are sequentially connected in parallel to correspond to the first module 35a, the second module 35b, the third module 35c, the fourth module 35d, the fifth module 35e, the sixth module 35f, the seventh module 35g, the eighth module 35h and the ninth module 35i.

The first AC application unit 33a, the second AC application unit 33b, and the third AC application unit 33c apply the alternating currents I (Bt21), I (Bt22), and I (Bt23) having the phases sequentially offset from each other by 120° (=360°/3) to the first module 35a, the second module 35b, and the third module 35c which are formed as a set. The fourth AC application unit 33d, the fifth AC application unit 33e, and the sixth AC application unit 33f apply the alternating currents I (Bt24), I (Bt25), and I (Bt26) having the phases sequentially offset from each other by 120° (=360°/3) to the fourth module 35d, the fifth module 35e, and the sixth module 35f which are formed as a set. The seventh AC application unit 33g, the eighth AC application unit 33h, and the ninth AC application unit 33i apply the alternating currents I (Bt27), I (Bt28), and I (Bt29) having the phases sequentially offset from each other by 120° (=360°/3) to the seventh module 35g, the eighth module 35h, and the ninth module 35i which are formed as a set.

Additionally, the alternating currents I (Bt21), I (Bt24), and I (Bt27) caused by the first AC application unit 33a, the fourth AC application unit 33d, and the seventh AC application unit 33g have the same phases. The alternating currents I (Bt22), I (Bt25), and I (Bt28) caused by the second AC application unit 33b, the fifth AC application unit 33e, and the eighth AC application unit 33h have the same phases. The alternating currents I (Bt23), I (Bt26), and I (Bt29) caused by the third AC application unit 33c, the sixth AC application unit 33f, and the ninth AC application unit 33i have the same phases.

Figure 18:
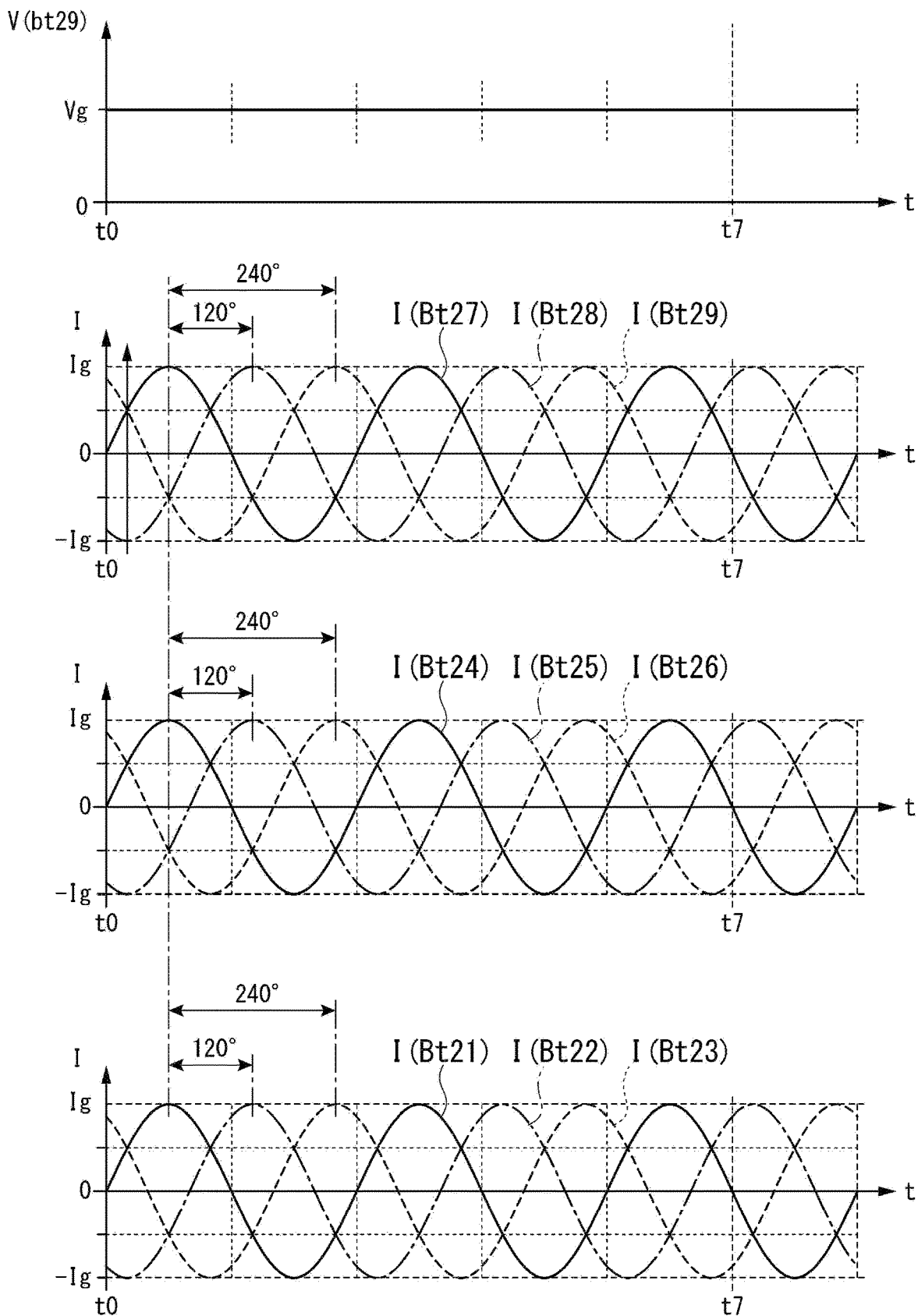
FIG. 18 is a diagram showing a waveform of the alternating current applied to each module of the battery and a waveform of the voltage applied to the positive electrode terminal of the battery of the power storage system of the sixth modified example of the embodiment of the disclosure.

FIG. 18 is a diagram showing a waveform of the alternating current applied to each module 35 of the battery 31 and a waveform of the voltage applied to the positive electrode terminal BP of the battery 31 of the power storage system 10 of the sixth modified example of the embodiment.

As shown in FIG. 18, the amplitude of each of the alternating current I (Bt21) of the first module 35a, the alternating current I (Bt22) of the second module 35b, the alternating current I (Bt23) of the third module 35c, the alternating current I (Bt24) of the fourth module 35d, the alternating current I (Bt25) of the fifth module 35e, the alternating current I (Bt26) of the sixth module 35f, the alternating current I (Bt27) of the seventh module 35g, the alternating current I (Bt28) of the eighth module 35h, and the alternating current I (Bt29) of the ninth module 35i is the same predetermined amplitude Ig. The alternating currents I (Bt21), I (Bt24), and I (Bt27) have the same phases. The alternating currents I (Bt22), I (Bt25), I (Bt28) have the same phases and have phases offset from the alternating currents I (Bt21), I (Bt24), and I (Bt27) by 120°. The alternating currents I (Bt23), I (Bt26), and I (Bt29) have the same phases and have phases offset from the alternating currents I (Bt22), I (Bt25), and I (Bt28) by 120°. Since the voltage at both ends of three adjacent modules 35 in each of three sets of module sets 81 is canceled, the voltage fluctuation at the positive electrode terminal BP of the battery 31 caused by nine AC application units 33 is canceled and a voltage V (bt29) of the positive electrode terminal BP is a predetermined voltage Vg.

According to the sixth modified example, since the alternating currents I having phases offset from each other by (360°/m) are sequentially applied to m modules 35 in each of k module sets 81, the voltage fluctuation generated at both ends of m continuously adjacent modules 35 is canceled and the voltage fluctuation at both ends of the battery 31 can be canceled.

Since the alternating currents I having the phases of the same combination between k module sets 81 are applied to m modules 35 of k mutual module sets 81, it is possible to further promote the attenuation of the voltage fluctuation at both ends of the battery 31 when the positive and the negative of the alternating current I are symmetrical.

Seventh Modified Example

In the sixth modified example of the above-described embodiment, although it has been described that the phases of the alternating currents I of m modules 35 of k mutual module sets 81 are the phases having the same combination between k module sets 81, the disclosure is not limited thereto.

For example, as in the AC application unit 33A of the fifth modified example of the above-described embodiment, when the positive and the negative of the alternating current I applied to each module 35 are asymmetrical, the phases of the alternating currents I of m modules 35 of k mutual module sets 81 may be sequentially offset from each other by (360°/(m×k)) in k module sets 81.

Figure 19:
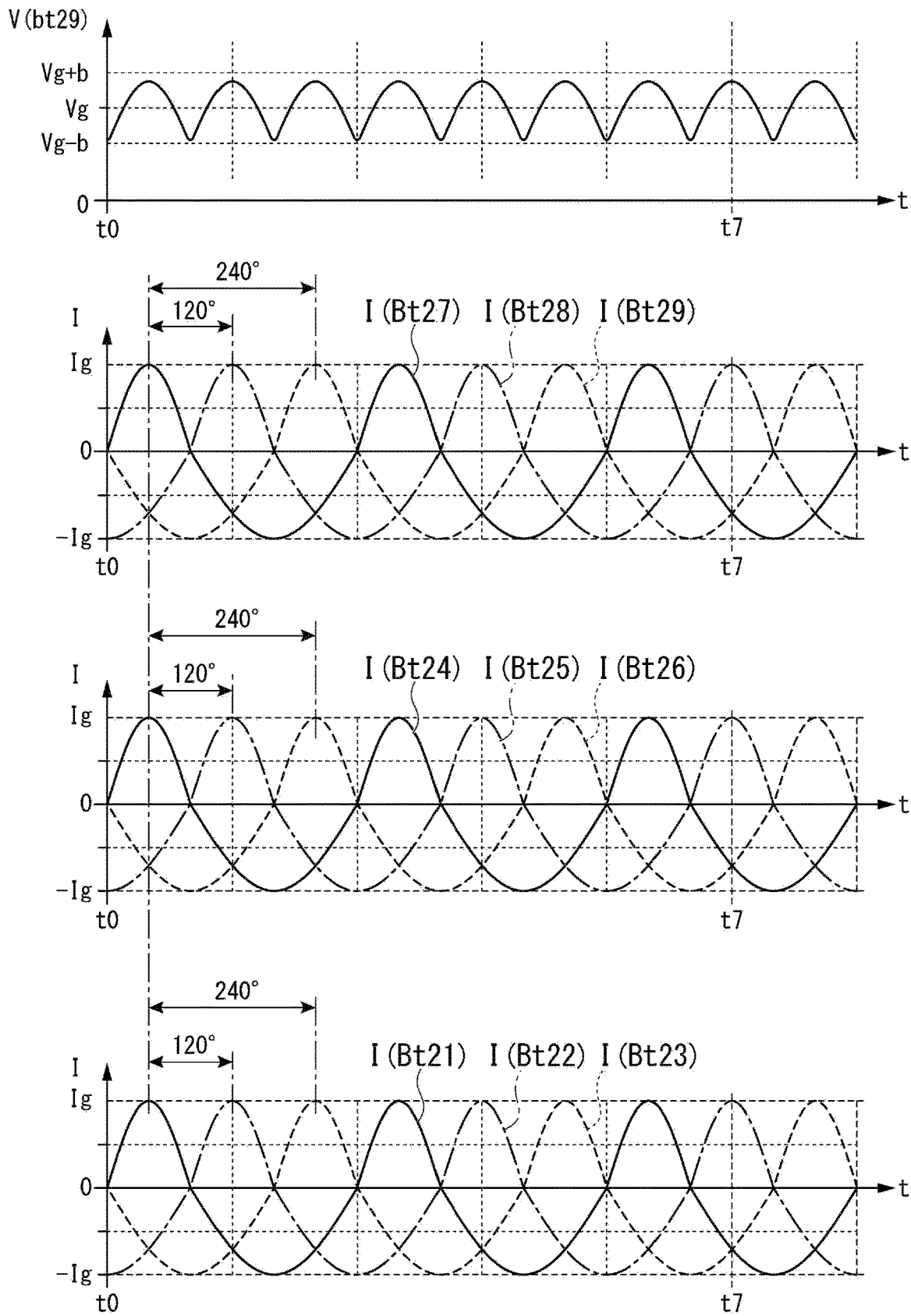
FIG. 19 is a diagram showing a first example of a waveform of an alternating current applied to each module of a battery and a first example of a waveform of a voltage applied to a positive electrode terminal of the battery of a power storage system of a comparative example of a seventh modified example of the embodiment of the disclosure.
Figure 20:
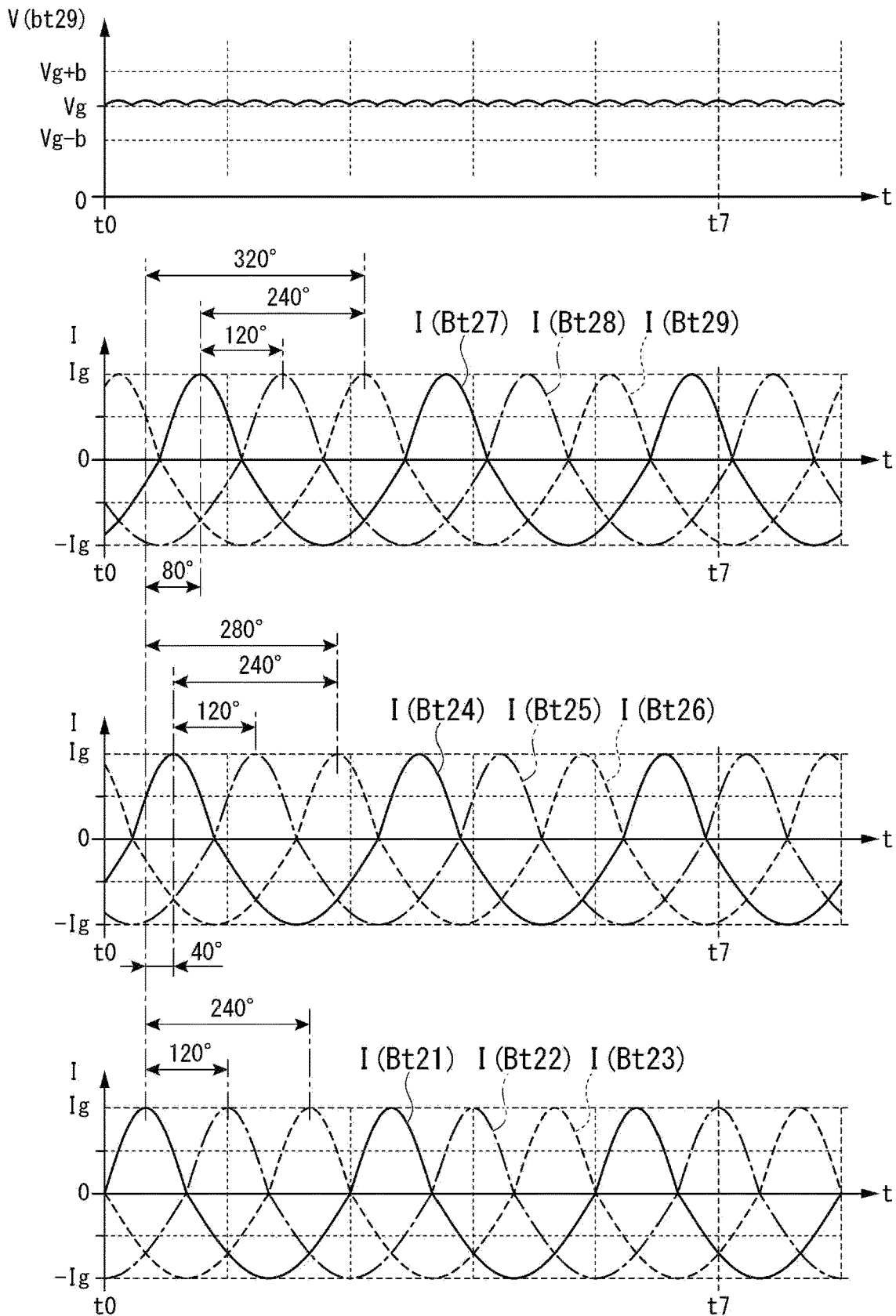
FIG. 20 is a diagram showing a second example of the waveform of the alternating current applied to each module of the battery and a second example of the waveform of the voltage applied to the positive electrode terminal of the battery of the power storage system of the seventh modified example of the embodiment of the disclosure.

FIG. 19 is a diagram showing a waveform of the alternating current applied to each of the modules 35 of the battery 31 and a waveform of the voltage applied to the positive electrode terminal BP of the battery 31 of the power storage system 10 of a comparative example of the seventh modified example of the embodiment. FIG. 20 is a diagram showing a waveform of the alternating current applied to each of the modules 35 of the battery 31 and a waveform of the voltage applied to the positive electrode terminal BP of the battery 31 of the power storage system 10 of the seventh modified example of the embodiment.

As shown in FIGS. 19 and 20, the amplitude of each of the alternating current I (Bt21) of the first module 35a, the alternating current I (Bt22) of the second module 35b, the alternating current I (Bt23) of the third module 35c, the alternating current I (Bt24) of the fourth module 35d, the alternating current I (Bt25) the fifth module 35e, the alternating current I (Bt26) of the sixth module 35f, the alternating current I (Bt27) of the seventh module 35g, the alternating current I (Bt28) of the eighth module 35h, and the alternating current I (Bt29) of the ninth module 35i is the same predetermined amplitude Ig.

In the comparative example shown in FIG. 19, when the positive and the negative of the alternating current I applied to each module 35 are asymmetrical, the phases of the alternating currents I of m modules 35 of k mutual module sets 81 are the phases having the same combination between k module sets 81 similarly to the above-described sixth modified example. The alternating currents I (Bt21), I (Bt24), and I (Bt27) have the same phases. The alternating currents I (Bt22), I (Bt25), and I (Bt28) have the same phases and have the phases offset from the alternating currents I (Bt21), I (Bt24), and I (Bt27) by 120°. The alternating currents I (Bt23), I (Bt26), and I (Bt29) have the same phases and have the phases offset from the alternating currents I (Bt22), I (Bt25), and I (Bt28) by 120°. The cancellation of the voltage fluctuation in three adjacent modules 35 in each of three sets of module sets 81 is suppressed and the cancellation of the voltage fluctuation at the positive electrode terminal BP of the battery 31 caused by nine AC application units 33 is suppressed. The voltage V (bt29) of the positive electrode terminal BP fluctuates, for example, above and below the predetermined voltage Vg in the range of a predetermined value b (Vg−b to Vg+b).

Compared to the comparative example shown in FIG. 19, in the seventh modified example shown in FIG. 20, when the positive and the negative of the alternating current I applied to each module 35 are asymmetrical, the phases of the alternating currents I of m modules 35 of k mutual module sets 81 are sequentially offset from each other by (360°/(m×k)) in k module sets 81. The phases of three alternating currents I (Bt21), I (Bt24), and I (Bt27) are sequentially offset from each other by 40° (=360°/9). The phases of three alternating currents I (Bt22), I (Bt25), and I (Bt28) are sequentially offset from each other by 40° (=360°/9) and are offset from the phases of the alternating currents I (Bt21), I (Bt24), and I (Bt27) by 120° (=360°/3). The phases of three alternating currents I (Bt23), I (Bt26), and I (Bt29) are sequentially offset from each other by 40° (=360°/9) and are offset from the phases of the alternating currents I (Bt22), I (Bt25), and I (Bt28) by 120° (=360°/3). The voltage fluctuation at both ends of three adjacent modules 35 in each of three module sets 81 is suppressed compared to the comparative example shown in FIG. 19 and the voltage fluctuation at the positive electrode terminal BP of the battery 31 caused by nine AC application units 33 is suppressed. The voltage V (bt29) of the positive electrode terminal BP fluctuates, for example, above the predetermined voltage Vg in the range of the predetermined value b (Vg to Vg+b).

According to the seventh modified example, since the alternating currents I having the phases sequentially offset from each other by (360°/(m×k)) in k module sets 81 are applied to m modules 35 of k mutual module sets 81, it is possible to further promote the attenuation of the voltage fluctuation at both ends of the battery 31 when the positive and the negative of the alternating current I are asymmetrical.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power storage system comprising:
   a power storage device which is formed by connecting a plurality of power storage elements;
   a plurality of modules which are formed by dividing the power storage device into a plurality of parts, wherein the plurality of modules are (m×k) modules by any natural number m of 2 or more and any natural number k and k module sets are formed by m modules sequentially adjacent to each other; and a plurality of AC application units connected in parallel to different modules of the plurality of modules and configured to apply alternating currents to the respective modules, wherein each of the plurality of AC application units comprises an AC power supply configured to generate the alternating current and a transformer connected in parallel between the respective module and the respective AC power supply and configured to transform an AC power of the respective AC power supply, and wherein a plurality of phases of the alternating currents generated by the AC power supplies of the plurality of AC application units are sequentially offset from each other by ($360°/m$).

2. The power storage system according to claim 1, wherein the plurality of AC application units apply the alternating currents having the phases of the same combination between the k module sets to the m modules of the k module sets of each other.

3. The power storage system according to claim 1, wherein the plurality of AC application units apply the alternating currents having the phases sequentially offset from each other by ($360°/(m \times k)$) in the k module sets to the m modules of the k module sets of each other.

* * * * *